US012756952B2

(12) United States Patent
Aoki

(10) Patent No.: US 12,756,952 B2
(45) Date of Patent: Oct. 6, 2026

(54) PHOTOELECTRIC CONVERSION DEVICE, INFORMATION PROCESSING DEVICE, METHOD FOR CONTROLLING PHOTOELECTRIC CONVERSION DEVICE, AND INFORMATION PROCESSING METHOD

(71) Applicant: CANON KABUSHIKI KAISHA, Tokyo (JP)

(72) Inventor: Kunitoshi Aoki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 19/065,928

(22) Filed: Feb. 27, 2025

(65) Prior Publication Data

US 2025/0280207 A1 Sep. 4, 2025

(30) Foreign Application Priority Data

Feb. 29, 2024 (JP) ................................ 2024-029439

(51) Int. Cl.
*H04N 25/62* (2023.01)
*H04N 25/77* (2023.01)

(52) U.S. Cl.
CPC ............. *H04N 25/62* (2023.01); *H04N 25/77* (2023.01)

(58) Field of Classification Search
CPC ....... H04N 25/77; H04N 25/62; H04N 25/773
USPC ..................................................... 348/207.99
See application file for complete search history.

(56) References Cited

U.S. PATENT DOCUMENTS

| | | | | |
|---|---|---|---|---|
| 8,693,775 B2 * | 4/2014 | Murao | H04N 25/134 382/167 |
| 9,270,894 B2 * | 2/2016 | Yamamoto | H04N 23/749 |
| 9,895,047 B2 * | 2/2018 | Tanabe | H04N 23/60 |
| 10,321,075 B2 * | 6/2019 | Kaneda | H04N 25/78 |
| 11,172,151 B2 * | 11/2021 | Suzuki | H04N 23/745 |
| 11,418,733 B2 * | 8/2022 | Takado | H04N 23/73 |
| 12,457,435 B2 * | 10/2025 | Numata | H04N 25/773 |

(Continued)

FOREIGN PATENT DOCUMENTS

| | | |
|---|---|---|
| JP | 2008148129 A | 6/2008 |
| WO | 2014103169 A1 | 7/2014 |
| WO | 2017013972 A1 | 1/2017 |

*Primary Examiner* — Pritham D Prabhakher
(74) *Attorney, Agent, or Firm* — Canon.U.S.A., Inc. IP Division

(57) ABSTRACT

A photoelectric conversion device includes a pixel, a memory, and a processing unit. The pixel generates the signal in a second accumulation period including a first accumulation period and a subsequent period. The processing unit acquires a first signal corresponding to an amount of incident light in the first accumulation period from the memory in a period from an end of the first accumulation period to an end of the second accumulation period. The processing unit generates pixel information indicating that a pixel does not satisfy a predetermined criterion when it is detected that the pixel does not satisfy the predetermined criterion by using the first signal. The processing unit acquires a second signal corresponding to an amount of incident light in the second accumulation period from the memory after the end of the second accumulation period. The processing unit corrects the second signal based on the pixel information.

20 Claims, 20 Drawing Sheets

(56) References Cited

U.S. PATENT DOCUMENTS

| | | | | |
|---|---|---|---|---|
| 2011/0032393 | A1* | 2/2011 | Yamaguchi | H04N 25/68 348/E9.037 |
| 2012/0250992 | A1* | 10/2012 | Murao | H04N 25/134 382/167 |
| 2015/0009397 | A1 | 1/2015 | Yamamoto | |
| 2017/0209023 | A1 | 7/2017 | Tanabe | |
| 2018/0139400 | A1* | 5/2018 | Kaneda | H04N 25/626 |
| 2018/0338102 | A1* | 11/2018 | Saito | H04N 25/77 |
| 2021/0014439 | A1* | 1/2021 | Yamanaka | H04N 25/131 |
| 2022/0094867 | A1* | 3/2022 | Takado | H04N 25/59 |
| 2022/0252569 | A1* | 8/2022 | Wakasugi | G01N 33/15 |
| 2024/0107199 | A1* | 3/2024 | Numata | H04N 25/773 |

* cited by examiner

F1_1

F1_2

F1_3

F1_4

PHOTOELECTRIC CONVERSION DEVICE, INFORMATION PROCESSING DEVICE, METHOD FOR CONTROLLING PHOTOELECTRIC CONVERSION DEVICE, AND INFORMATION PROCESSING METHOD

BACKGROUND OF THE INVENTION

Field of the Invention

The present disclosure relates to a photoelectric conversion device, an information processing device, a method for controlling a photoelectric conversion device, and an information processing method.

Description of the Related Art

Japanese Patent Application Laid-Open No. 2008-148129 discloses an imaging device that detects an abnormal pixel in each of a plurality of images captured under different conditions, and determines an abnormality factor of the detected abnormal pixel based on a difference in output levels of the abnormal pixels.

However, there is a case where it is required to further reduce a processing delay caused by detecting and correcting a pixel that is outside a predetermined reference range.

SUMMARY OF THE INVENTION

An object of the present disclosure is to provide a photoelectric conversion device, an information processing device, a method for controlling a photoelectric conversion device, and an information processing method in which a delay time for detecting and correcting a pixel that is outside a predetermined reference range is further reduced.

According to one disclosure of the present specification, there is provided a photoelectric conversion device including a pixel configured to generate a signal corresponding to an amount of incident light, a memory configured to hold the signal, and a processing unit configured to perform signal processing based on the signal held in the memory. The pixel generates the signal in a second accumulation period including a first accumulation period and a period after the first accumulation period. The processing unit acquires a first signal corresponding to an amount of incident light in the first accumulation period from the memory in a period from an end of the first accumulation period to an end of the second accumulation period. The processing unit generates pixel information indicating that a pixel does not satisfy a predetermined criterion when it is detected that the pixel does not satisfy the predetermined criterion by using the first signal. The processing unit acquires a second signal corresponding to an amount of incident light in the second accumulation period from the memory after the end of the second accumulation period. The processing unit corrects the second signal based on the pixel information.

According to one disclosure of the present specification, there is provided an information processing device including a detection unit configured to generate pixel information indicating that a pixel does not satisfy a predetermined criterion when it is detected that the pixel does not satisfy the predetermined criterion by using a first signal corresponding to an amount of light incident on the pixel in a first accumulation period, and a correction unit configured to correct a second signal corresponding to an amount of light incident on the pixel in a second accumulation period including the first accumulation period and a period after the first accumulation period based on the pixel information. The detection unit acquires the first signal during a period from an end of the first accumulation period to an end of the second accumulation period. The correction unit acquires the second signal after the end of the second accumulation period.

According to one disclosure of the present specification, there is provided a method for controlling a photoelectric conversion device including a pixel configured to generate a signal corresponding to an amount of incident light, a memory configured to hold the signal, and a processing unit configured to perform signal processing based on the signal held in the memory. The method includes generating, by the pixel, the signal in a second accumulation period including a first accumulation period and a period after the first accumulation period, acquiring, by the processing unit, a first signal corresponding to an amount of incident light in the first accumulation period from the memory in a period from an end of the first accumulation period to an end of the second accumulation period, generating, by the processing unit, pixel information indicating that a pixel does not satisfy a predetermined criterion when it is detected that the pixel does not satisfy the predetermined criterion by using the first signal, acquiring, by the processing unit, a second signal corresponding to an amount of incident light in the second accumulation period from the memory after the end of the second accumulation period, and correcting, by the processing unit, the second signal based on the pixel information.

According to one disclosure of the present specification, there is provided an information processing method including generating abnormal pixel information indicating an abnormal pixel detection result based on a first signal corresponding to an amount of light incident on a pixel in a first accumulation period, and correcting a second signal corresponding to an amount of light incident on the pixel in a second accumulation period including the first accumulation period and a period after the first accumulation period based on the abnormal pixel information. The first signal is acquired during a period from an end of the first accumulation period to an end of the second accumulation period. The second signal is acquired after the end of the second accumulation period.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. Identical elements or corresponding elements across multiple drawings are denoted by common reference signs, and the description thereof may be omitted or simplified.

First Embodiment

Figure 1:
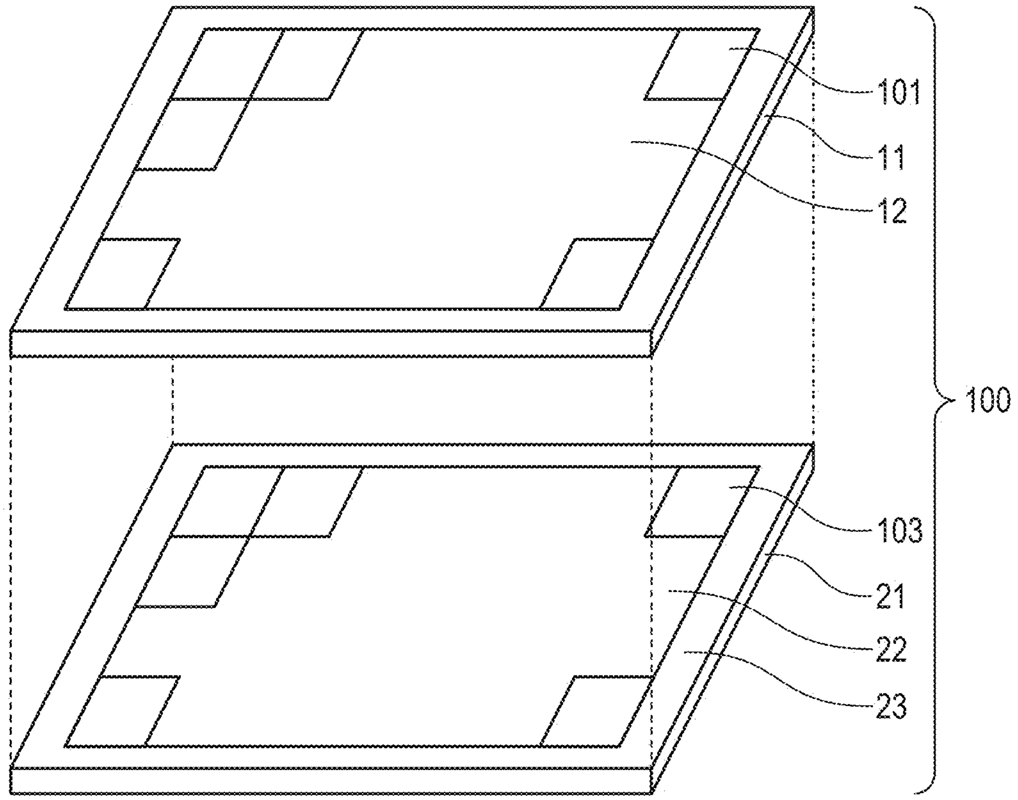
FIG. 1 is a schematic diagram illustrating an overall configuration of a photoelectric conversion device according to a first embodiment.

FIG. 1 is a schematic diagram illustrating an overall configuration of a photoelectric conversion device according to the present embodiment. The photoelectric conversion device 100 includes a sensor substrate 11 and a circuit substrate 21 stacked on each other. The sensor substrate 11 and the circuit substrate 21 are electrically connected to each other. The sensor substrate 11 has a pixel region 12 in which a plurality of pixels 101 are arranged to form a plurality of rows and a plurality of columns. The circuit substrate 21 includes a first circuit region 22 in which a plurality of pixel signal processing units 103 are arranged to form a plurality of rows and a plurality of columns, and a second circuit region 23 arranged on an outer periphery of the first circuit region 22. The second circuit region 23 may include a circuit or the like that controls the plurality of pixel signal processing units 103.

Figure 2:
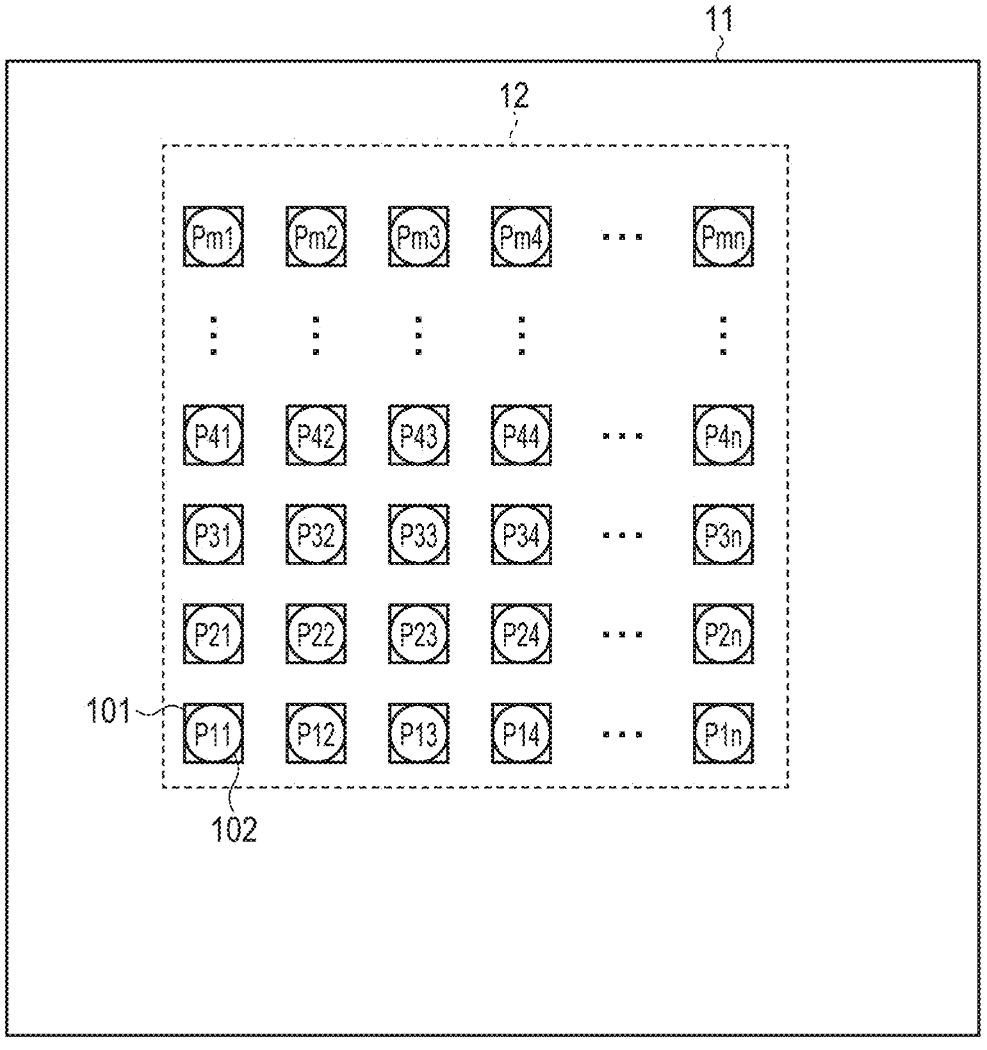
FIG. 2 is a schematic block diagram illustrating a configuration example of a sensor substrate according to the first embodiment.

FIG. 2 is a schematic block diagram illustrating a configuration example of the sensor substrate 11 according to the present embodiment. In the pixel region 12, a plurality of pixels 101 are arranged to form a plurality of rows and a plurality of columns. Each of the plurality of pixels 101 includes a photoelectric conversion unit 102 including an avalanche photodiode (hereinafter, referred to as APD) as a photoelectric conversion element in the substrate. FIG. 2 illustrates some of m×n pixels 101 arranged in m rows from the first row to the m-th row and n columns from the first column to the n-th column, together with reference signs indicating row numbers and column numbers. For example, the pixel 101 arranged in the first row and the third column is denoted by reference sign "P13". Note that the number of rows and the number of columns of the pixel array constituting the pixel region 12 are not particularly limited.

Figure 3:
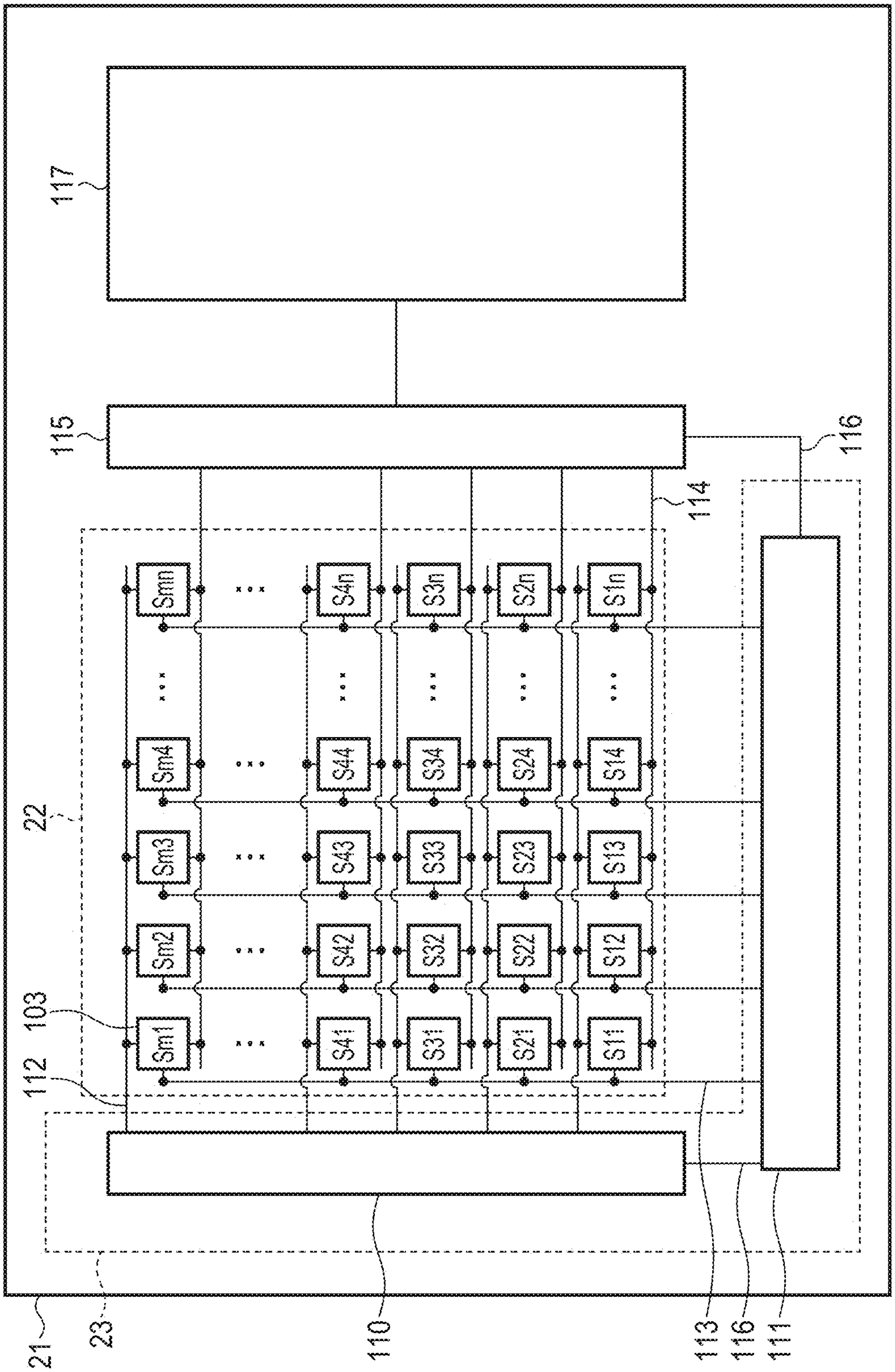
FIG. 3 is a schematic block diagram illustrating a configuration example of a circuit substrate according to the first embodiment.

FIG. 3 is a schematic block diagram illustrating a configuration example of the circuit substrate 21 according to the present embodiment. The circuit substrate 21 includes a first circuit region 22, a second circuit region 23, a signal reading circuit 115, and a signal processing unit 117 (processing unit).

In the first circuit region 22, the plurality of pixel signal processing units 103 are arranged to form a plurality of rows and a plurality of columns. In FIG. 3, some of the m×n pixel signal processing units 103 arranged in m rows from the first row to the m-th row and n columns from the first column to the n-th column, together with reference signs indicating row numbers and column numbers. For example, the pixel signal processing unit 103 arranged in the first row and the third column is denoted by reference signs "S13". Note that the number of rows and the number of columns of the pixel signal processing unit array constituting the first circuit region 22 are not particularly limited.

In the second circuit region 23, a vertical control pulse generation unit 110 and a horizontal control pulse generation unit 111 are arranged. In each row of the pixel signal processing unit array in the first circuit region 22, a vertical control line 112 and a data output line 114 extending in a first direction (a transverse direction in FIG. 3) are arranged. The vertical control line 112 and the data output line 114 are connected to each of the plurality of pixel signal processing units 103 arranged in the first direction. The first direction in which the vertical control line 112 extends may be referred to as a row direction or a horizontal direction.

In each column of the pixel signal processing unit array in the first circuit region 22, a horizontal control line 113 extending in a second direction (a longitudinal direction in FIG. 3) is arranged. The horizontal control line 113 is connected to each of the plurality of pixel signal processing units 103 arranged in the second direction. The second direction in which the horizontal control line 113 extends may be referred to as a column direction or a vertical direction.

The vertical control line 112 for each row is connected to the vertical control pulse generation unit 110. The vertical control pulse generation unit 110 supplies a control signal for driving the pixel signal processing unit 103 to the pixel signal processing unit 103 via the vertical control line 112. The horizontal control line 113 for each column is connected to the horizontal control pulse generation unit 111. The horizontal control pulse generation unit 111 supplies a control signal for driving the pixel signal processing unit 103 to the pixel signal processing unit 103 via the horizontal control line 113. The vertical control pulse generation unit 110, the horizontal control pulse generation unit 111, and the signal reading circuit 115 are connected via a read control line 116. The vertical control pulse generation unit 110 supplies a control signal for driving the horizontal control pulse generation unit 111 and the signal reading circuit 115 via the read control line 116. As a result, the vertical control pulse generation unit 110, the horizontal control pulse generation unit 111, and the signal reading circuit 115 operate in a synchronized state. The vertical control pulse generation unit 110 may generate a control signal based on an external trigger that is not illustrated, or may generate a control signal based on an internal signal.

The data output line 114 for each row is connected to the signal reading circuit 115. The data output line 114 is a signal line for transmitting data held by the pixel signal processing unit 103. In response to the control signal supplied from the vertical control pulse generation unit 110 via the read control line 116, the signal reading circuit 115 acquires a plurality of pieces of data from the data output line 114 and outputs the acquired data to the signal processing unit 117.

The signal processing unit 117 is an information processing device that processes the acquired image data. The signal processing unit 117 reads and executes a computer-executable instruction. The signal processing unit 117 may be a computer including one or more processors and one or more memories. The signal processing unit 117 may include a plurality of separated computers, or may include a plurality of separated processors. Furthermore, the signal processing unit 117 may include one or more processing circuits. The processor or circuit may include a central processing unit (CPU), a micro processing unit (MPU), a graphics processing unit (GPU), an application specific integrated circuit (ASIC), or a field programmable gate array (FPGA). The processor or circuit may also include a digital signal processor (DSP), a data flow processor (DFP), or a neural processing unit (NPU).

Although the signal processing unit 117 is arranged in the circuit substrate 21 in the example of the present embodiment, the function of the signal processing unit 117 may be arranged outside the circuit substrate 21. For example, the function of the signal processing unit 117 may be arranged on an external controller system. In this case, data is output from the signal reading circuit 115 to the controller system via an output interface circuit. That is, in the example of the present embodiment, the photoelectric conversion device 100 is an integrated device including the signal processing unit 117, but may be configured as a photoelectric conversion system including a photoelectric conversion device and a controller system (information processing device) communicatively connected to each other.

Figure 4:
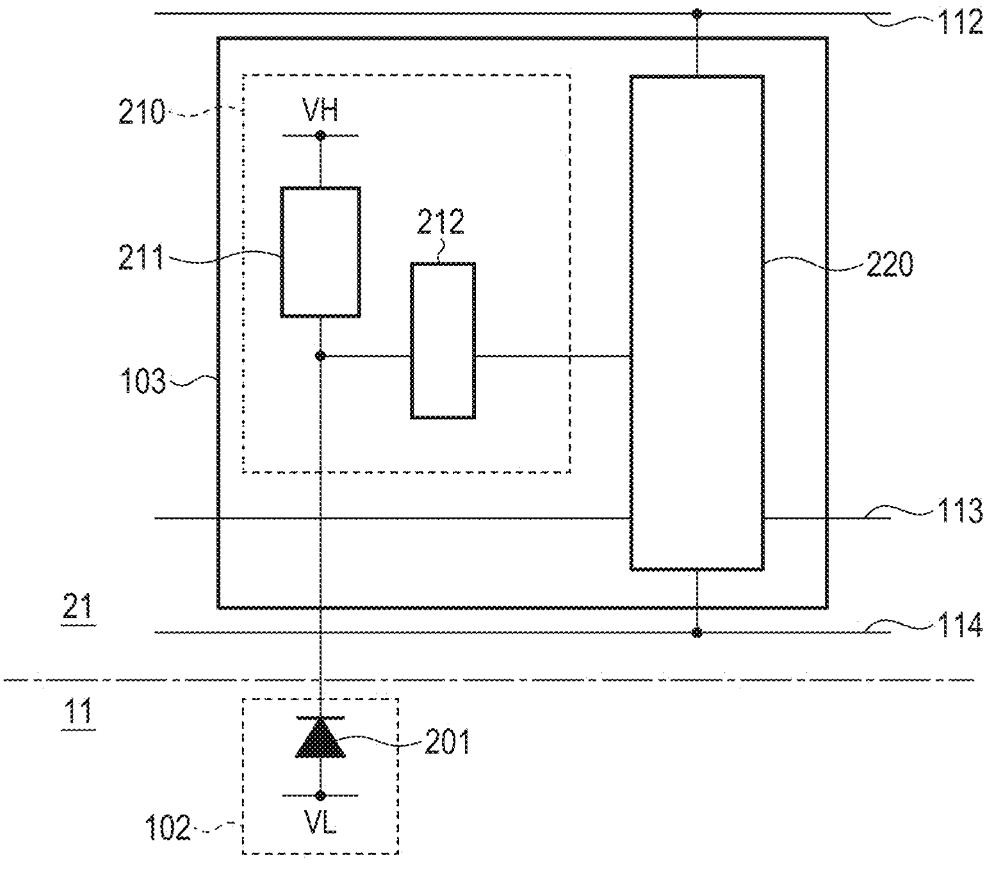
FIG. 4 is a schematic block diagram illustrating a configuration example for one pixel of a photoelectric conversion unit and a pixel signal processing unit according to the first embodiment.

FIG. 4 is a schematic block diagram illustrating a configuration example for one pixel of the photoelectric conversion unit 102 and the pixel signal processing unit 103 according to the present embodiment. FIG. 4 schematically illustrates a more specific configuration example including a connection relationship between the photoelectric conversion unit 102 arranged in the sensor substrate 11 and the pixel signal processing unit 103 arranged in the circuit substrate 21.

The photoelectric conversion unit 102 includes an APD 201. The pixel signal processing unit 103 includes a pulse generation unit 210 and a pulse processing unit 220. The pulse generation unit 210 includes a quenching element 211 and a waveform shaping unit 212.

The APD 201 generates a charge pair corresponding to incident light by photoelectric conversion. A voltage VL (first voltage) is supplied to an anode of the APD 201. In addition, a cathode of the APD 201 is connected to a first terminal of the quenching element 211 and an input terminal of the waveform shaping unit 212. A voltage VH (second voltage) higher than the voltage VL supplied to the anode is supplied to the cathode of the APD 201. As a result, a reverse bias voltage is supplied to the anode and the cathode of the APD 201 such that the APD 201 performs an avalanche multiplication operation. In the APD 201 to which the reverse bias voltage is supplied, when a charge is generated by incident light, the charge causes avalanche multiplication, and an avalanche current is generated.

The quenching element 211 has a function of replacing a change in avalanche current generated in the APD 201 with a voltage signal. Further, the quenching element 211 functions as a load circuit (quenching circuit) during signal multiplication by avalanche multiplication. At this time, the quenching element 211 suppresses the voltage supplied to the APD 201 to suppress avalanche multiplication (quenching operation). The quenching element 211 may be, for example, a resistive element.

The waveform shaping unit 212 shapes a potential change of the cathode of the APD 201 generated at the time of photon detection, and outputs a pulse signal. As the waveform shaping unit 212, for example, a circuit having a waveform shaping effect such as an inverter circuit or a buffer circuit is used.

The pulse processing unit 220 receives photon detection pulses generated by the pulse generation unit 210 and counts the number of photon detection pulses. The configuration and operation of the pulse processing unit 220 will be described below with reference to FIG. 6.

In the present embodiment, a configuration example using a single photon avalanche diode (SPAD) by the APD 201 as the photoelectric conversion element is illustrated, but the photoelectric conversion element is not limited thereto. Any photoelectric conversion element can be applied to the photoelectric conversion device 100 of the present embodiment as long as the photoelectric conversion element has a configuration capable of reading out information on the amount of incident light obtained by photoelectric conversion during an accumulation period.

Furthermore, in the present embodiment, all of the plurality of pixels 101 in the pixel region 12 are read, but the present invention is not limited thereto. For example, a part of the pixel region 12 may be read. Alternatively, only a predetermined number of bits of a digital signal acquired by each of the plurality of pixels 101 may be read. In addition, in the present embodiment, each of the plurality of pixels 101 has a pixel memory and is capable of performing reading by a global shutter method, but the present invention is not limited thereto. For example, reading may be performed by a rolling shutter method.

Figure 5A:
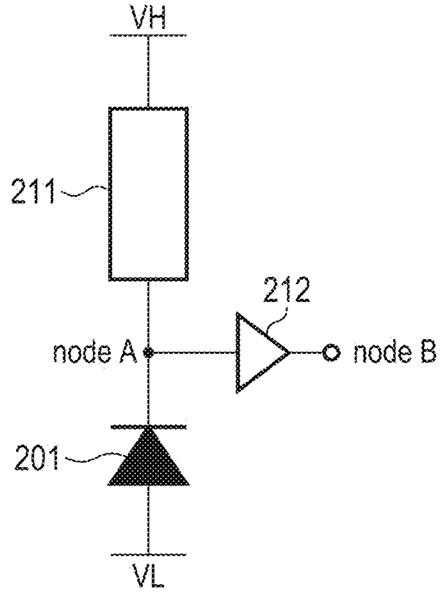
FIGS. 5A, 5B, and 5C are diagrams for explaining an operation of an avalanche photodiode according to the first embodiment.
Figure 5B:
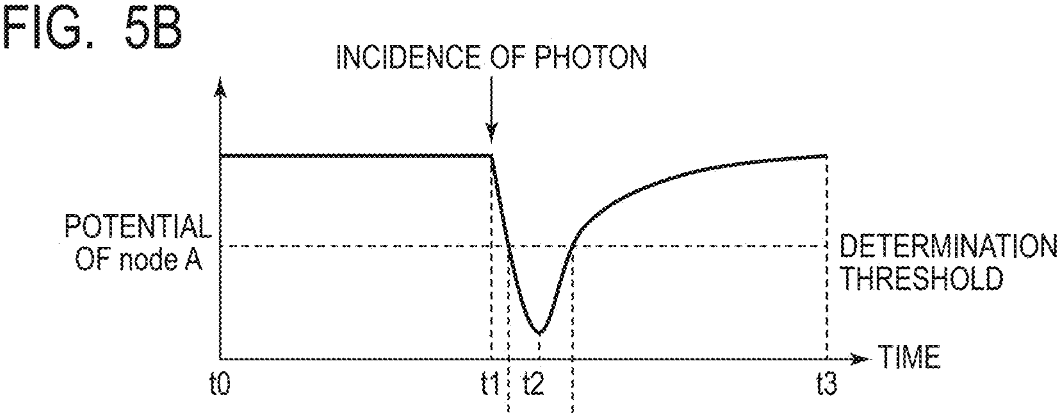
Figure 5C:
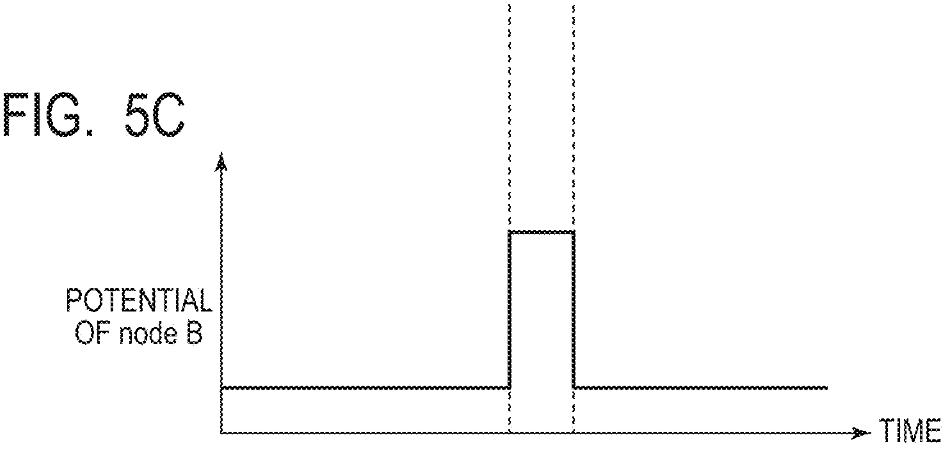

FIGS. 5A, 5B, and 5C are diagrams for explaining an operation of the APD 201 according to the present embodiment. FIG. 5A is a diagram illustrating the APD 201, the quenching element 211, and the waveform shaping unit 212 extracted from FIG. 4. As illustrated in FIG. 5A, a connection node between the APD 201, the quenching element 211, and the input terminal of the waveform shaping unit 212 is node A. In addition, as illustrated in FIG. 5A, the output side of the waveform shaping unit 212 is node B. In the description based on FIGS. 5A, 5B, and 5C, the waveform shaping unit 212 is assumed to be an inverter circuit.

FIG. 5B is a graph illustrating a temporal change in potential of node A of FIG. 5A. FIG. 5C is a graph illustrating a temporal change in potential of node B of FIG. 5A. During a period from time t0 to time t1, a voltage of VH-VL is applied to the APD 201 of FIG. 5A. When a photon is incident on the APD 201 at time t1, avalanche multiplication occurs in the APD 201. As a result, an avalanche current flows through the quenching element 211, and the potential of node A drops. Thereafter, the potential drop amount further increases, and the voltage applied to the APD 201 gradually decreases. Then, at time t2, the avalanche multiplication in the APD 201 stops. As a result, the voltage level of node A does not drop below a certain fixed value. Thereafter, during a period from time t2 to time t3, a current compensating for the voltage drop flows from the node of the voltage VH into node A, and node A settles to its original potential at time t3.

In the above-described process, the potential of node B goes to a high level during a period in which the potential of node A is lower than a certain threshold. In this way, the waveform of the potential drop of node A caused by the incidence of photon is shaped by the waveform shaping unit 212 and output as a pulse to node B.

Figure 6:
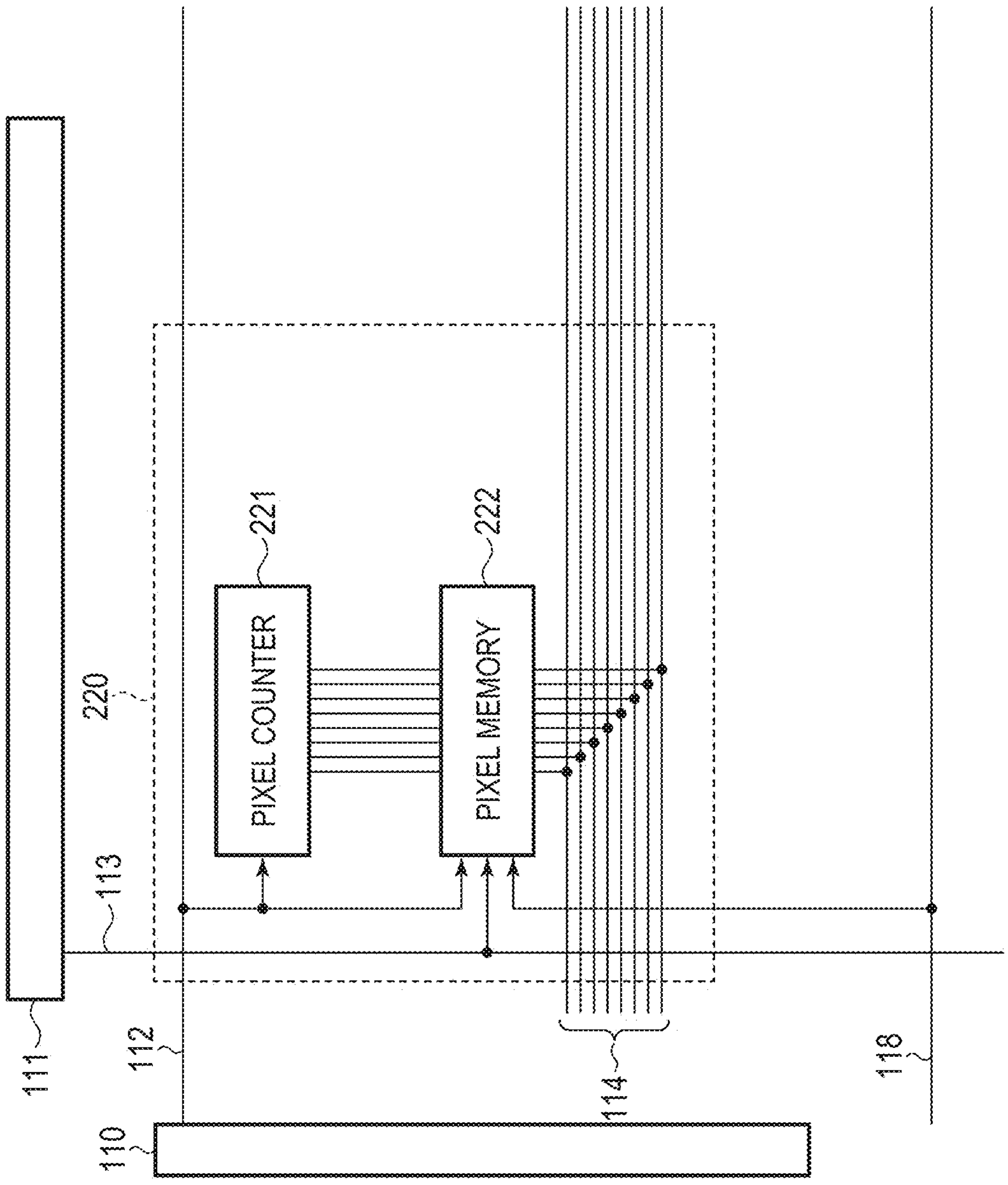
FIG. 6 is a block diagram illustrating a configuration example of a pulse processing unit according to the first embodiment.

FIG. 6 is a block diagram illustrating a configuration example of the pulse processing unit 220 according to the present embodiment. The pulse processing unit 220 includes a pixel counter 221 and a pixel memory 222 (memory). FIG. 6 illustrates an example in which the pixel counter 221 can output an 8-bit digital signal and the pixel memory 222 has an 8-bit storage capacity, but the number of bits is not limited to 8.

The pixel counter 221 counts the number of photon detection pulses output from the pulse generation unit 210, starting from the accumulation start time of one frame period. A memory transfer signal is input to the pixel memory 222 via a transfer signal line 118. The pixel memory 222 latches a count value held by the pixel counter 221 at the timing when the memory transfer signal is asserted. The memory transfer signal may be output from the vertical control pulse generation unit 110, may be output from the horizontal control pulse generation unit 111, or may be output from a control circuit that is not illustrated. The controls of the pixel counter 221 and the pixel memory 222, such as starting an operation, stopping an operation, and resetting a held value, are performed for each row by a control signal supplied from the vertical control pulse generation unit 110 via the vertical control line 112.

The values held in the pixel memory 222 are output to the data output line 114 during accumulation in one frame period and at a predetermined timing after the accumulation is completed. The data output line 114 is an 8-bit parallel bus extending in the first direction, and can transmit an 8-bit digital signal. A plurality of pixel memories 222 arranged in the horizontal direction is connected to the data output line 114.

The vertical control pulse generation unit 110 and the horizontal control pulse generation unit 111 output, to the pixel memory 222, a selection signal for selecting the pixel signal processing unit 103 that output a count value via the vertical control line 112 and the horizontal control line 113, respectively. In response to this selection signal, electrical connection or disconnection between the pixel memory 222 and the data output line 114 is switched. As a result, the pixel memory 222 of the selected pixel signal processing unit 103 outputs the held value to the data output line 114.

Figure 7:
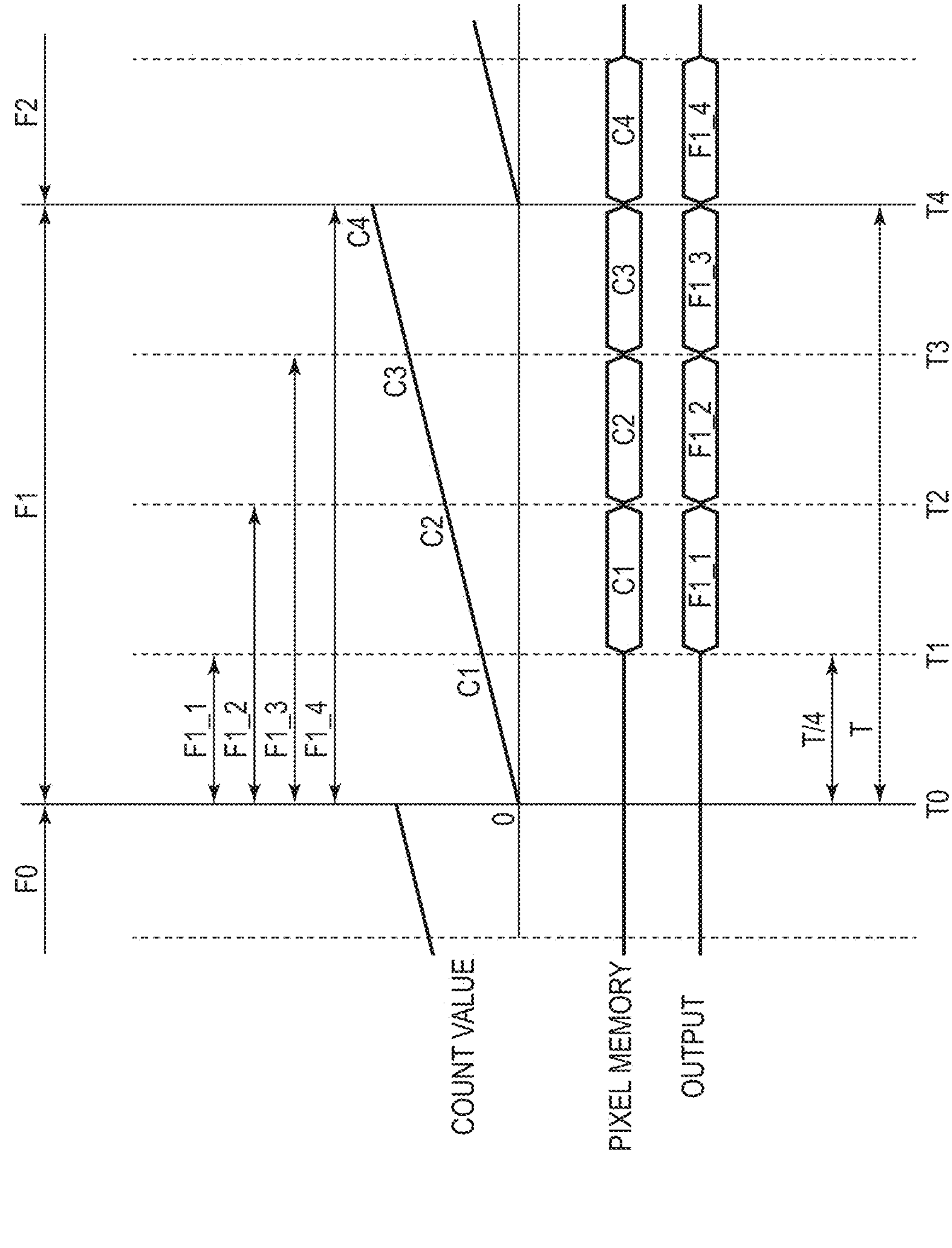
FIG. 7 is a timing chart for explaining an operation of the pulse processing unit according to the first embodiment.

FIG. 7 is a timing chart for explaining an operation of the pulse processing unit 220 according to the present embodiment. FIG. 7 mainly illustrates an operation in frame period F1 among three consecutive frame periods F0, F1, and F2.

In the present embodiment, one frame period F1 includes four types of accumulation periods F1_1, F1_2, F1_3, and F1_4. Accumulation period F1_1 is a period from time T0, which is the start time of frame period F1, to time T1. If the length of frame period F1 is T, the length of accumulation period F1_1 is T/4. Accumulation period F1_2 is a period from time T0 to time T2. The length of accumulation period F1_2 is 2T/4. Accumulation period F1_3 is a period from time T0 to time T3. The length of accumulation period F1_3 is 3T/4. Accumulation period F1_4 is a period from time T0 to time T4, which is the end time of frame period F1. The length of accumulation period F1_4 is T. In other words, accumulation period F1_4 is the same period as frame period F1. In this manner, accumulation period F1_4 (second accumulation period) includes accumulation period F1_1 (first accumulation period) and a period after accumulation period F1_1 (time T1 to time T4).

The "count value" in FIG. 7 indicates a count value held in the pixel counter 221. The count value increases over time within frame period F1 as the pixel counter 221 counts the number of photon detection pulses. Then, the count value is reset when the time has elapsed to each of times T0 and T4 at which the frame period is switched. However, the count value is not reset at a timing in the middle of frame period F1. That is, the count value is not reset at the end of any of accumulation periods F1_1, F1_2, and F1_3 (time T1, T2, or T3). The count values at times T1, T2, T3, and T4 are denoted by C1, C2, C3, and C4, respectively. In this period, the count value monotonically increases. Therefore, the count value C2 is greater than the count value C1, the count value C3 is greater than the count value C2, and the count value C4 is greater than the count value C3.

In addition, the count values C1, C2, C3, and C4 are temporarily stored in the pixel memory 222. The "pixel memory" in FIG. 7 indicates a count value temporarily held in the pixel memory 222. The signals temporarily stored in the pixel memory 222 is sequentially output to the signal processing unit 117 via the data output line 114 and the signal reading circuit 115. The "output" in FIG. 7 indicates an accumulation period of a signal output from the pixel memory 222.

As described above, a signal accumulated in accumulation period F1_1 is read in a period from time T1 to time T2. The signal processing unit 117 can start the processing at this point. Similarly, a signal accumulated in accumulation period F1_2 is read in a period from time T2 to time T3, and a signal accumulated in accumulation period F1_3 is read in a period from time T3 to time T4. A signal accumulated in accumulation period F1_4 is read in a period after time T4. The signal processing unit 117 can acquire signals for one frame period F1 a plurality of times, and can sequentially perform processing. Note that the signal processing unit 117 may not use all of the signal accumulated in accumulation period F1_1, the signal accumulated in accumulation period F1_2, the signal accumulated in accumulation period F1_3, and the signal accumulated in accumulation period F1_4. As will be described below, in the present embodiment, the signal accumulated in accumulation period F1_1 and the signal accumulated in accumulation period F1_4 are used for processing.

Figure 8:
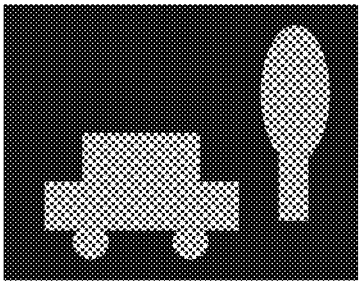
FIG. 8 is a diagram illustrating an example of an image acquired by the photoelectric conversion device according to the first embodiment.
Figure 8:
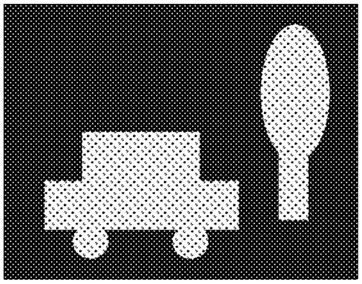
Figure 8:
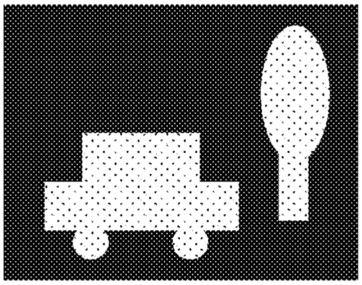
Figure 8:
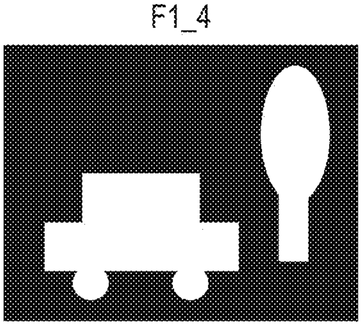

FIG. 8 is a diagram illustrating an example of an image acquired by the photoelectric conversion device according to the present embodiment. FIG. 8 illustrates images based on the signals accumulated in accumulation periods F1_1, F1_2, F1_3, and F1_4 described above. The shading in FIG. 8 indicates a pixel value, and a portion closer to white has a larger pixel value. As illustrated in FIG. 8, as the accumulation period is longer, an image with a subject (vehicle and tree) having a larger pixel value is obtained.

Figure 9:
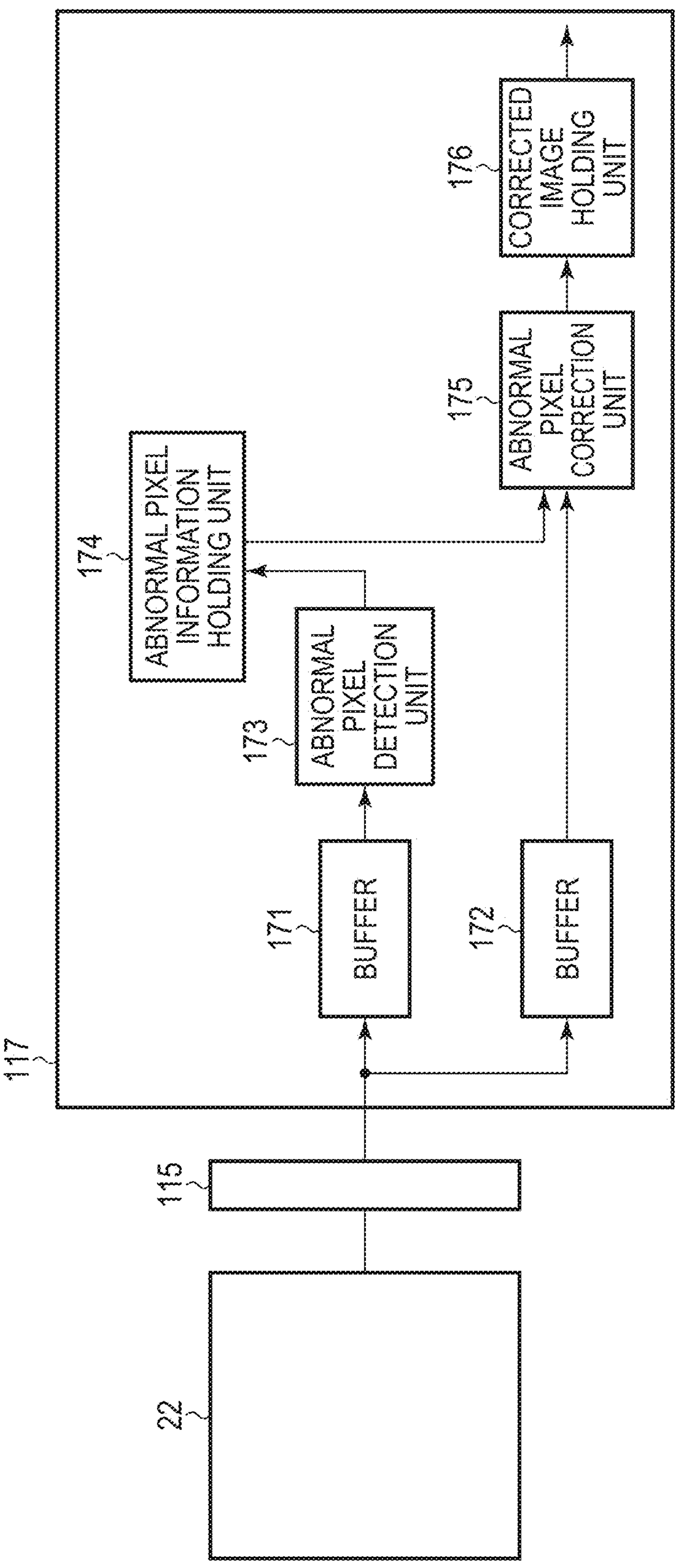
FIG. 9 is a block diagram illustrating a configuration example of a signal processing unit according to the first embodiment.

FIG. 9 is a block diagram illustrating a configuration example of the signal processing unit 117 according to the present embodiment. The signal processing unit 117 (information processing device) includes buffers 171 and 172, an abnormal pixel detection unit 173, an abnormal pixel information holding unit 174, an abnormal pixel correction unit 175, and a corrected image holding unit 176.

The buffer 171 holds an image based on the signal accumulated in accumulation period F1_1 among the plurality of images output from the pixel signal processing unit 103 of the first circuit region 22 via the signal reading circuit 115. The buffer 172 holds an image based on the signal accumulated in accumulation period F1_4 among the plurality of images output from the pixel signal processing unit 103 of the first circuit region 22 via the signal reading circuit 115. That is, the buffers 171 and 172 are frame buffers each having a storage capacity capable of holding one image.

The abnormal pixel detection unit 173 detects an abnormal pixel from the image based on the signal accumulated in accumulation period F1_1 and held in the buffer 171. The detection of the abnormal pixel may be processing of detecting that the pixel does not satisfy a predetermined criterion. Here, the predetermined criterion is determined in consideration of a range in which the pixel is handled as having no problem, and is appropriately set in consideration of, for example, a manufacturing error of the photoelectric conversion device. Then, the abnormal pixel detection unit 173 outputs abnormal pixel information indicating an abnormal pixel detection result to the abnormal pixel information holding unit 174. The abnormal pixel information may include pixel information indicating that the pixel does not satisfy the predetermined criterion. The abnormal pixel detection unit 173 is an example of a detection unit in the signal processing unit 117.

The detection of the abnormal pixel in the present embodiment will be described. The abnormal pixel is a pixel that outputs a unique pixel value as compared with neighboring pixels, not a pixel value corresponding to incident light. The abnormal pixel may include a so-called white or black scratch. The white scratch is an abnormal pixel having a significantly larger pixel value than neighboring pixels, and the black scratch is an abnormal pixel having a significantly smaller pixel value than neighboring pixels. In this manner, the pixel value of the abnormal pixel is often significantly different from the pixel values of the surrounding pixels. Therefore, by comparing the pixel value of the target pixel with the pixel values of its surroundings (e.g., eight neighboring pixels), it is possible to determine whether the target pixel is an abnormal pixel based on whether the pixel value of the target pixel is significantly different.

Figure 10:
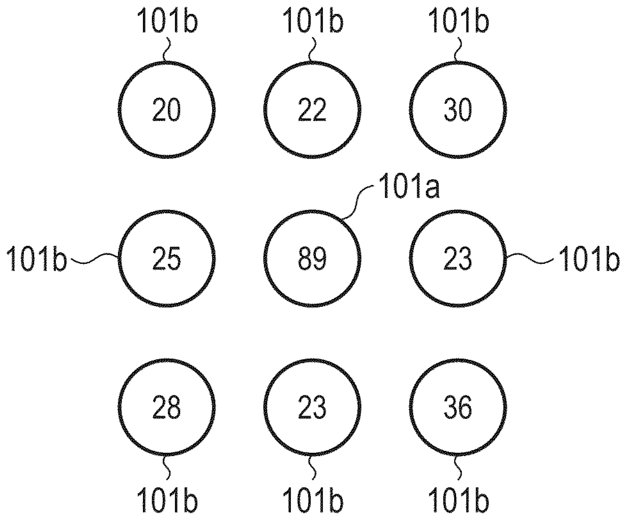
FIG. 10 is a schematic diagram illustrating an example of a target pixel and peripheral pixels according to the first embodiment.

FIG. 10 is a schematic diagram illustrating an example of a target pixel and peripheral pixels according to the present embodiment. FIG. 10 illustrates pixels of 3 rows and 3 columns extracted from the plurality of pixels 101 together with their pixel values. FIG. 10 illustrates a target pixel 101*a* arranged at the center and eight peripheral pixels 101*b* arranged around the target pixel 101*a*. A numerical value described in a circle representing each pixel indicates a pixel value. As illustrated in FIG. 10, the pixel value of the target pixel 101*a* is significantly larger than the pixel values of the peripheral pixels 101*b*. Therefore, the abnormal pixel can be detected, for example, by calculating a difference between the pixel value of the target pixel 101*a* and the average value of the pixel values of the peripheral pixels 101*b*, and determining that the target pixel 101*a* is an abnormal pixel when the difference is a predetermined threshold or more.

Note that, as illustrated in FIG. 8, in the present embodiment, the image in accumulation period F1_1 used for detection of abnormal pixel is an image having a pixel value smaller than that of the image in accumulation period F1_4 for image generation. Therefore, a value smaller than the difference between the pixel value of the target pixel 101*a* and the average value of the pixel values of the peripheral pixels 101*b* assumed in the image in accumulation period F1_4 for image generation may be used as the threshold for determination in the abnormal pixel detection unit 173. The length of accumulation period F1_1 is ¼ of the length of accumulation period F1_4. Therefore, it is preferable that the threshold is set to a relatively small value of about ¼ of the difference between the pixel value of the target pixel 101*a* and the average value of the pixel values of the peripheral pixels 101*b* assumed in the image in accumulation period F1_4 for image generation.

The abnormal pixel information output from the abnormal pixel detection unit 173 is held in the abnormal pixel information holding unit 174. The abnormal pixel information may include information indicating a coordinate of an abnormal pixel among the plurality of pixels 101. The abnormal pixel information may be map data in a matrix format having the number of rows and the number of columns of the pixels 101. Each element of this matrix is a 1-bit value indicating whether the pixel is normal or abnormal. The abnormal pixel information may be table data indicating XY coordinate information (row number and column number) of the abnormal pixel.

The abnormal pixel correction unit 175 corrects the abnormal pixel in the image in accumulation period F1_4 held in the buffer 172 based on the abnormal pixel information held in the abnormal pixel information holding unit 174. The method for correcting the abnormal pixel may be, for example, specifying a coordinate of the abnormal pixel from the abnormal pixel information, and replacing a value of the abnormal pixel at that coordinate with an interpolation value calculated from values of a plurality of peripheral pixels. The image in which the abnormal pixel is corrected by the abnormal pixel correction unit 175 is output to the corrected image holding unit 176. The corrected image holding unit 176 temporarily holds the corrected pixel. The corrected pixel can be output from the corrected image holding unit 176 to a circuit at the subsequent stage. The abnormal pixel correction unit 175 is an example of a correction unit in the signal processing unit 117.

Figure 11:
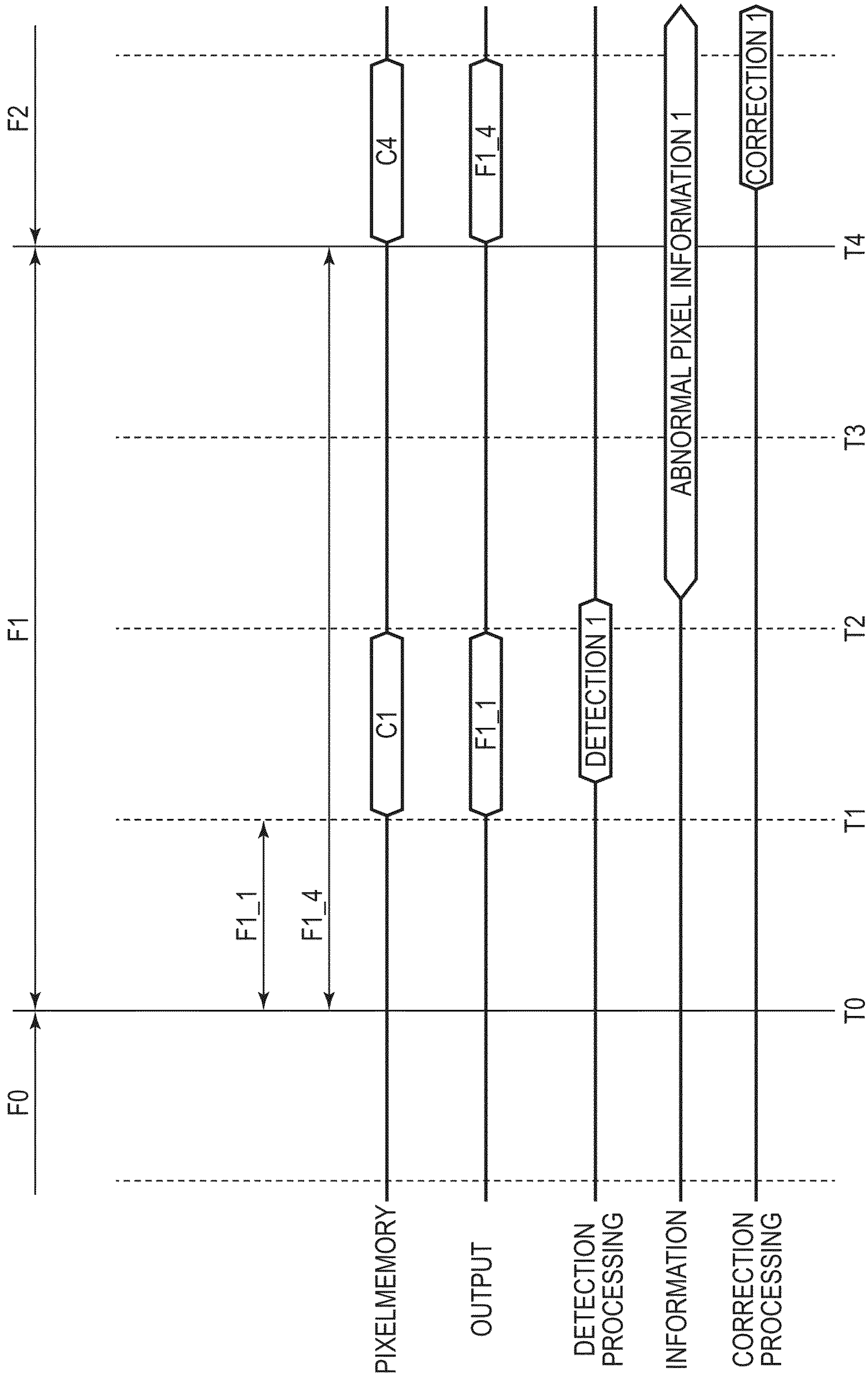
FIG. 11 is a timing chart for explaining an operation of the signal processing unit according to the first embodiment.

FIG. 11 is a timing chart for explaining an operation of the signal processing unit 117 according to the present embodiment. FIG. 11 illustrates timings of signal input to the signal processing unit 117, signal processing in the signal processing unit 117, and the like. The notations of the frame period, the "pixel memory", and the "output" are substantially the same as those in FIG. 7, and thus the description thereof is omitted.

The "detection processing" in FIG. 11 indicates a timing at which the abnormal pixel detection unit 173 performs abnormal pixel detection processing. The "information" in FIG. 11 indicates information held in the abnormal pixel information holding unit 174 and a holding timing. The "correction processing" in FIG. 11 indicates a timing at which the abnormal pixel correction unit 175 performs abnormal pixel correction processing. Note that, in the configuration of the signal processing unit 117 in FIG. 9, buffers for holding images in accumulation periods F1_2 and F1_3 are not arranged, and processing using these images is not performed. Therefore, in FIG. 11, the "pixel memory" and "output" fields do not include operation timings related to accumulation periods F1_2 and F1_3 and count values C2 and C3.

After the output of the image (first signal) in accumulation period F1_1 is started at time T1, the abnormal pixel detection unit 173 starts abnormal pixel detection processing ("detection 1" in FIG. 11). After a predetermined time has elapsed from the start of the abnormal pixel detection processing, the abnormal pixel information holding unit 174 updates the abnormal pixel information ("abnormal pixel information 1" in FIG. 11). After the output of the image (second signal) in accumulation period F1_4 is started at time T4, the abnormal pixel correction unit 175 starts abnormal pixel correction processing ("correction 1" in FIG. 11).

In this manner, since the period during which the abnormal pixel detection processing is performed overlaps accumulation period F1_4, the abnormal pixel detection processing and the accumulation are performed in parallel. Therefore, the processing time of the abnormal pixel detection processing does not affect the length of frame period F1, and the abnormal pixel detection processing can be performed without affecting the entire processing time. Then, since the abnormal pixel detection processing can be completed early, the abnormal pixel correction processing can be started immediately after the end of accumulation period F1_4. Therefore, according to the present embodiment, there are provided a photoelectric conversion device, an information processing device, a method for controlling a photoelectric conversion device, and an information processing method in which a processing delay caused by detecting and correcting a pixel that is outside a predetermined reference range is further reduced.

In addition, since accumulation period F1_1 for abnormal pixel detection processing is shorter than accumulation period F1_4 for image generation, signal saturation hardly occurs. Therefore, the possibility of detection omission of an abnormal pixel caused by signal saturation can be reduced.

Furthermore, in the present embodiment, the upper limit of time that can be allocated to the abnormal pixel detection processing is 3T/4, which is relatively long. In FIG. 11, the abnormal pixel detection processing is performed for a time of about T/4, but it is also possible to execute additional processing, which results in the total processing time longer than T/4, thereby improving the abnormal pixel detection accuracy.

Figure 12:
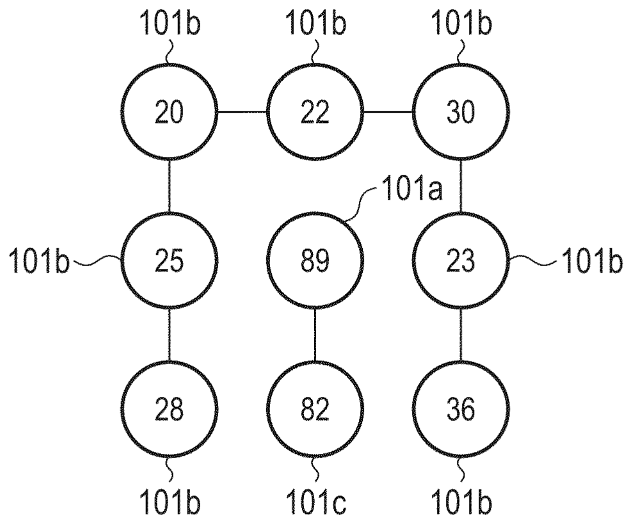
FIG. 12 is a schematic diagram illustrating an example of a target pixel and peripheral pixels according to a modification of the first embodiment.

An example of the additional processing will be described. When the temperature of the sensor substrate 11 is high, the number of abnormal pixels may increase, and the abnormal pixels may be adjacent to each other. FIG. 12 is a schematic diagram illustrating an example of a target pixel and peripheral pixels according to a modification of the present embodiment. FIG. 12 illustrates an example of a pixel value in a case where the temperature of the sensor substrate 11 is high, and a peripheral pixel 101*c*, which is one of the eight peripheral pixels arranged around the target pixel 101*a*, is an abnormal pixel. In such a case, the difference between the pixel value of the target pixel 101*a* and the average value of the pixel values of the peripheral pixels 101*b* and 101*c* decreases, which may decrease the abnormal pixel determination accuracy.

In such a case, the abnormal pixel determination accuracy can be improved by adding processing of determining whether the abnormal pixel is an isolated point. This processing will be described. In a case where pixel values of adjacent pixels are close to each other (the difference between the pixel values is within a predetermined range), it is determined that these adjacent pixels are connected. Then, the pixels connected to each other are treated as one pixel group, and the number of pixels (connection number) for each pixel group is counted. In the example of FIG. 12, the number of pixels having pixel values of 20 to 40 is 7 (the connection number is 7), whereas the number of pixels having pixel values of 80 to 100 is 2 (the connection number is 2). A pixel group in which the connection number is N (N is a positive integer) or less among the pixel groups after the connection processing is set as an isolated point. For example, when N=2, it is determined that the above-described two pixels having pixel values of 80 to 100 are isolated points and both are abnormal pixels. When the temperature of the sensor substrate 11 is higher and the density of abnormal pixels is higher, the threshold N for the connection number may need to be set to 3 or more. In this manner, in a case where the threshold N for the connection number is large, the range of pixels of which pixel values are to be referred to at the time of processing becomes broad, and accordingly, the processing load, such as memory access and the amount of calculation, increases. However, even in a case where the processing load increases and a long time is required for the processing, in the present embodiment, the abnormal pixel detection processing can be started early and completed early, thereby reducing the processing delay.

Second Embodiment

In the first embodiment, the signal processing unit 117 acquires one image during accumulation in frame period F1 and performs abnormal pixel detection processing. On the other hand, in the present embodiment, a method in which the signal processing unit 117 acquires a plurality of images during accumulation in frame period F1 and performs abnormal pixel detection processing a plurality of times will be described. In the present embodiment, the description of elements common to the first embodiment may be omitted or simplified.

Figure 13:
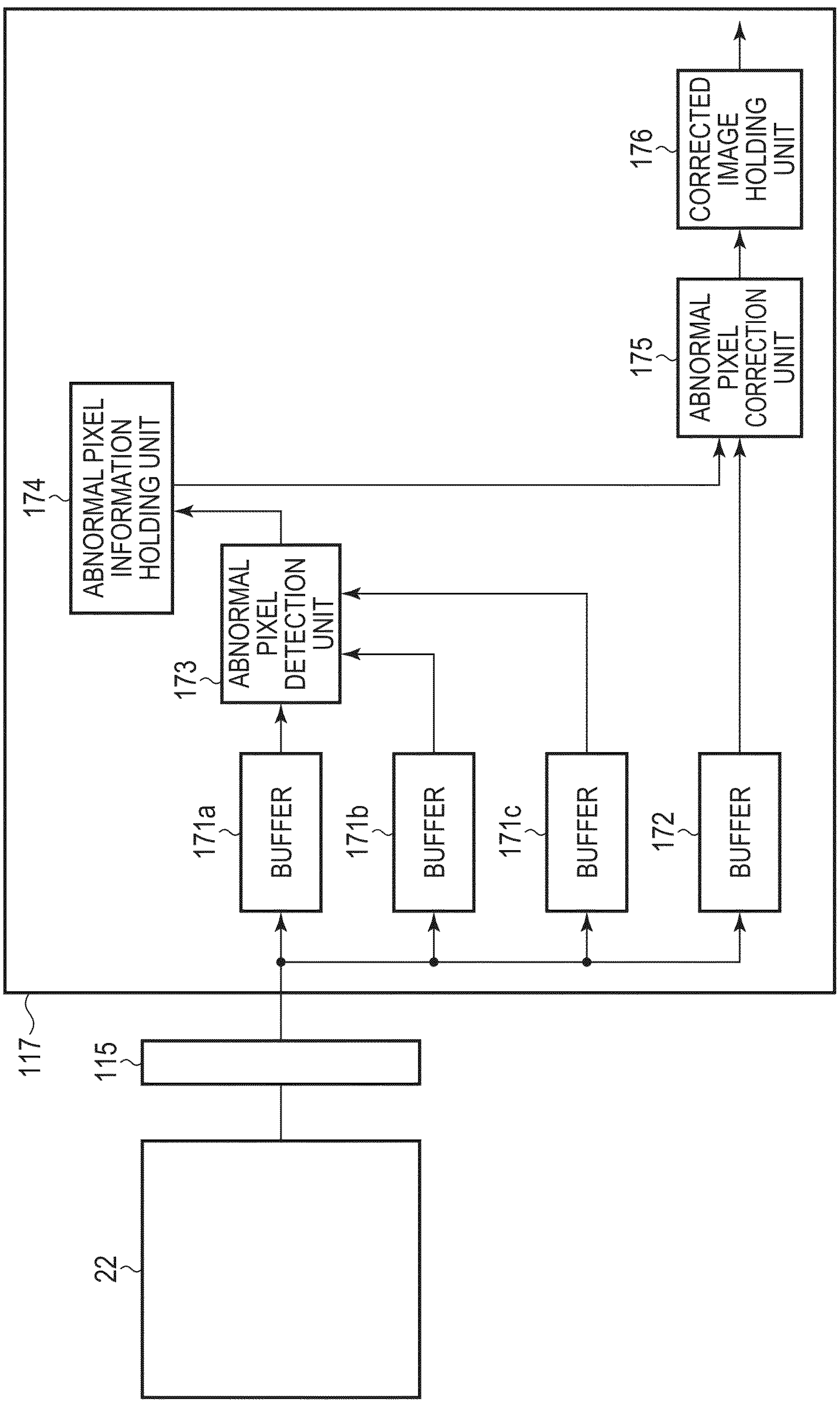
FIG. 13 is a block diagram illustrating a configuration example of a signal processing unit according to a second embodiment.

FIG. 13 is a block diagram illustrating a configuration example of the signal processing unit 117 according to the present embodiment. The signal processing unit 117 includes four buffers 171*a*, 171*b*, 171*c*, and 172. That is, the buffer 171 in FIG. 9 is replaced with three buffers 171*a*, 171*b*, and 171*c* in the present embodiment. The other configurations of FIG. 13 are similar to those of FIG. 9.

The buffer 171*a* holds an image based on the signal accumulated in accumulation period F1_1 among the plurality of images output from the pixel signal processing unit 103 of the first circuit region 22 via the signal reading circuit 115. Similarly, the buffers 171*b*, 171*c*, and 172 hold images based on the signals accumulated in accumulation periods F1_2, F1_3, and F1_4, respectively.

The abnormal pixel detection unit 173 acquires a plurality of images based on the signals accumulated in accumulation periods F1_1, F1_2, and F1_3 from the buffers 171*a*, 171*b*, and 171*c*. The abnormal pixel detection unit 173 detects an abnormal pixel from each of these images. The lengths of accumulation periods F1_1, F1_2, and F1_3 are ¼, 2/4, and ¾ of the length of accumulation period F1_4, respectively. Therefore, the threshold for determination used for abnormal pixel detection may be different for each of these images. These thresholds may be set to, for example, ¼, 2/4, and ¾ of the difference between the pixel value of the target pixel 101*a* and the average value of the pixel values of the peripheral pixels 101*b* assumed in the image in accumulation period F1_4 for image generation, respectively.

The abnormal pixel detection unit 173 integrates abnormal pixel detection results from the plurality of images, respectively, to generate abnormal pixel information. The abnormal pixel information output from the abnormal pixel detection unit 173 is held in the abnormal pixel information holding unit 174. The abnormal pixel information may be map data in a matrix format having the number of rows and the number of columns of the pixels 101. Each element of this matrix is a 1-bit value indicating whether the pixel is normal or abnormal. The abnormal pixel information may be table data indicating XY coordinate information (row number and column number) of the abnormal pixel.

An example of a method of integrating abnormal pixel detection results from a plurality of images, respectively, will be described. As a first example, there is a method of determining an abnormal pixel based on a logical product of detection results. In this method, when an abnormal pixel is detected at the same coordinate in all of the plurality of images, the pixel at that coordinate is determined to be an abnormal pixel.

In a case where the abnormal pixel information is map data having a 1-bit value, a logical product can be acquired as follows. First, when an abnormal pixel is detected in the image in accumulation period F1_1, "1", which is a value indicating abnormality, is written in the corresponding coordinate of the map data held in the abnormal pixel information holding unit 174. In addition, it is assumed that "0", which is a value indicating normality, is written in the other coordinates. When an abnormal pixel is detected in the images in accumulation periods F1_2 and F1_3, "1" is overwritten if "1" is written in the corresponding coordinate of the map data, and "0" is written otherwise. By writing values in the map data in this order, the map data in which "1" is written only in the coordinate where the detection result indicating abnormality is obtained three times is generated. In this manner, by acquiring a logical product of the plurality of detection results and determining an abnormal pixel, the possibility of erroneous detection of an abnormal pixel can be reduced.

As a second example of a method of integrating abnormal pixel detection results, there is a method of determining an abnormal pixel based on a logical sum of the detection results. In this method, when an abnormal pixel is detected in at least one of the plurality of images, the pixel at that coordinate is determined to be an abnormal pixel. In a case where the abnormal pixel information is map data, when an abnormal pixel is detected in the images in accumulation periods F1_1, F1_2, and F1_3, "1" is written in that coordinate regardless of the original value. By writing values in the map data in this order, the map data in which "1" is written in the coordinate where the detection result indicating abnormality is obtained at least once among the three times is generated. In this manner, by acquiring a logical sum of the plurality of detection results and determining an abnormal pixel, the possibility of detection omission of an abnormal pixel can be reduced. Note that the detection processing may not be performed for coordinate at which an abnormal pixel has been detected once. In this case, the calculation load and the processing time can be reduced.

As a third example of a method of integrating abnormal pixel detection results, there is a method of determining an abnormal pixel based on a majority logic of the detection results. In this method, when an abnormal pixel is detected in at least two (that is, the majority) of the plurality of images, the pixel at that coordinate is determined to be an abnormal pixel. As a result, it is possible to appropriately achieve a good balance between the possibility of erroneous detection of an abnormal pixel and the possibility of detection omission of an abnormal pixel.

Figure 14:
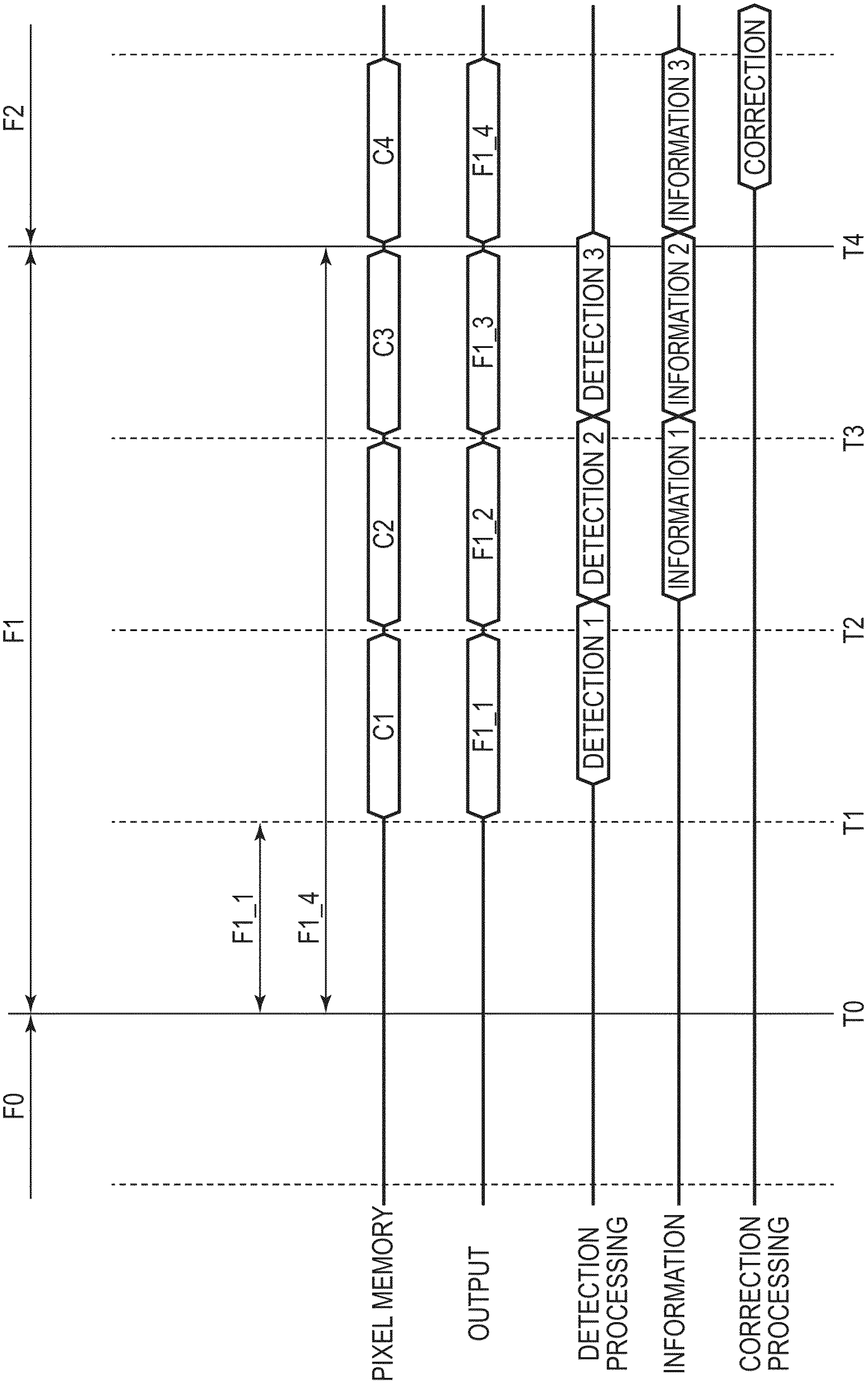
FIG. 14 is a timing chart for explaining an operation of the signal processing unit according to the second embodiment.

FIG. 14 is a timing chart for explaining an operation of the signal processing unit 117 according to the present embodiment. FIG. 14 illustrates timings of signal input to the signal processing unit 117, signal processing in the signal processing unit 117, and the like. The method of notating each item in FIG. 14 is substantially the same as that in FIG. 11, and thus the description thereof is omitted.

After the output of the image in accumulation period F1_1 is started at time T1, the abnormal pixel detection unit 173 starts abnormal pixel detection processing ("detection 1" in FIG. 14). After a predetermined time has elapsed from the start of the abnormal pixel detection processing, the abnormal pixel information holding unit 174 updates the abnormal pixel information ("information 1" in FIG. 14). After the output of the image in accumulation period F1_2 is started at time T2, the abnormal pixel detection unit 173 starts abnormal pixel detection processing ("detection 2" in FIG. 14). After a predetermined time has elapsed from the start of the abnormal pixel detection processing, the abnormal pixel information holding unit 174 updates the abnormal pixel information ("information 2" in FIG. 14). After the output of the image in accumulation period F1_3 is started at time T3, the abnormal pixel detection unit 173 starts abnormal pixel detection processing ("detection 3" in FIG. 14). After a predetermined time has elapsed from the start of the abnormal pixel detection processing, the abnormal pixel information holding unit 174 updates the abnormal pixel information ("information 3" in FIG. 14). After the output of the image in accumulation period F1_4 is started at time T4, the abnormal pixel correction unit 175 starts abnormal pixel correction processing ("correction" in FIG. 14).

In this manner, the plurality of times of abnormal pixel detection processing is performed at least partially in parallel with the accumulation operation in accumulation period F1_4. Therefore, even in a case where the abnormal pixel detection processing is performed a plurality of times, the processing time does not significantly affect frame period F1, and the abnormal pixel detection processing can be performed without significantly affecting the entire processing time. In addition, by integrating a plurality of detection results, the abnormal pixel detection accuracy can be improved.

Therefore, according to the present embodiment, there are provided a photoelectric conversion device, an information processing device, a method for controlling a photoelectric conversion device, and an information processing method capable of obtaining effects similar to those of the first embodiment. Furthermore, according to the present embodiment, by integrating a plurality of detection results, the abnormal pixel detection accuracy can be improved.

Third Embodiment

In the first embodiment and the second embodiment, the signal processing unit 117 has a configuration including buffers that hold images during accumulation and an abnormal pixel information holding unit 174 that holds abnormal pixel information. On the other hand, in the present embodiment, a configuration example in which an abnormal pixel is detected and corrected in real time without using these storage units will be described. In the present embodiment, the description of elements common to the first embodiment or the second embodiment may be omitted or simplified.

Figure 15:
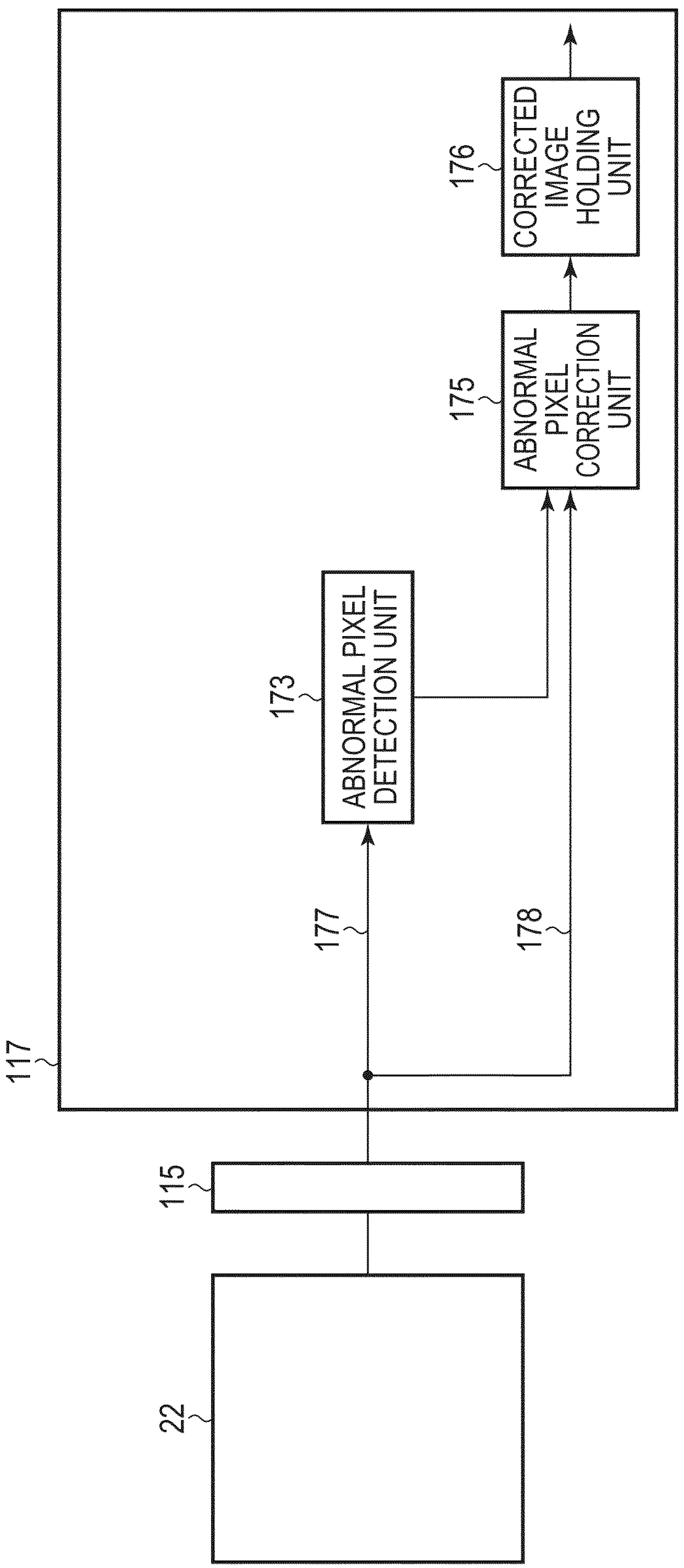
FIG. 15 is a block diagram illustrating a configuration example of a signal processing unit according to a third embodiment.

FIG. 15 is a block diagram illustrating a configuration example of the signal processing unit 117 according to the present embodiment. In FIG. 15, the buffers 171 and 172 and the abnormal pixel information holding unit 174 are not arranged as compared with the configuration of the signal processing unit 117 in FIG. 9. That is, in the present embodiment, a frame buffer having a storage capacity capable of holding one frame image is not arranged. Data input to the signal processing unit 117 via the signal reading circuit 115 is input to the abnormal pixel detection unit 173 and the abnormal pixel correction unit 175 via a plurality of data paths 177 and 178 in raster scan order. The abnormal pixel detection unit 173 and the abnormal pixel correction unit 175 include a hardware calculator that processes an input image in a predetermined clock cycle and a delay buffer that holds data for several lines of one image. The hardware calculator and the delay buffer sequentially process and output images while absorbing a difference in processing time. In this manner, the signal processing unit 117 is configured to generate abnormal pixel information by sequentially processing a plurality of signals constituting one frame image, rather than temporarily storing the plurality of signals simultaneously, at the time of acquiring the signals from the signal reading circuit 115.

Data based on the signal accumulated in accumulation period F1_1 among the plurality of images output from the pixel signal processing unit 103 of the first circuit region 22 via the signal reading circuit 115 passes through the data path 177, and is input to the abnormal pixel detection unit 173. Data based on the signal accumulated in accumulation period F1_4 among the plurality of images output from the pixel signal processing unit 103 of the first circuit region 22 via the signal reading circuit 115 passes through the data path 178, and is input to the abnormal pixel correction unit 175. The abnormal pixel detection unit 173 detects an abnormal pixel based on the input image in accumulation period F1_1, and outputs abnormal pixel information to the abnormal pixel correction unit 175. Based on the abnormal pixel information, the abnormal pixel correction unit 175 corrects the abnormal pixel included in the input image in accumulation period F1_4 in real time, and outputs the corrected image to the corrected image holding unit 176.

Figure 16:
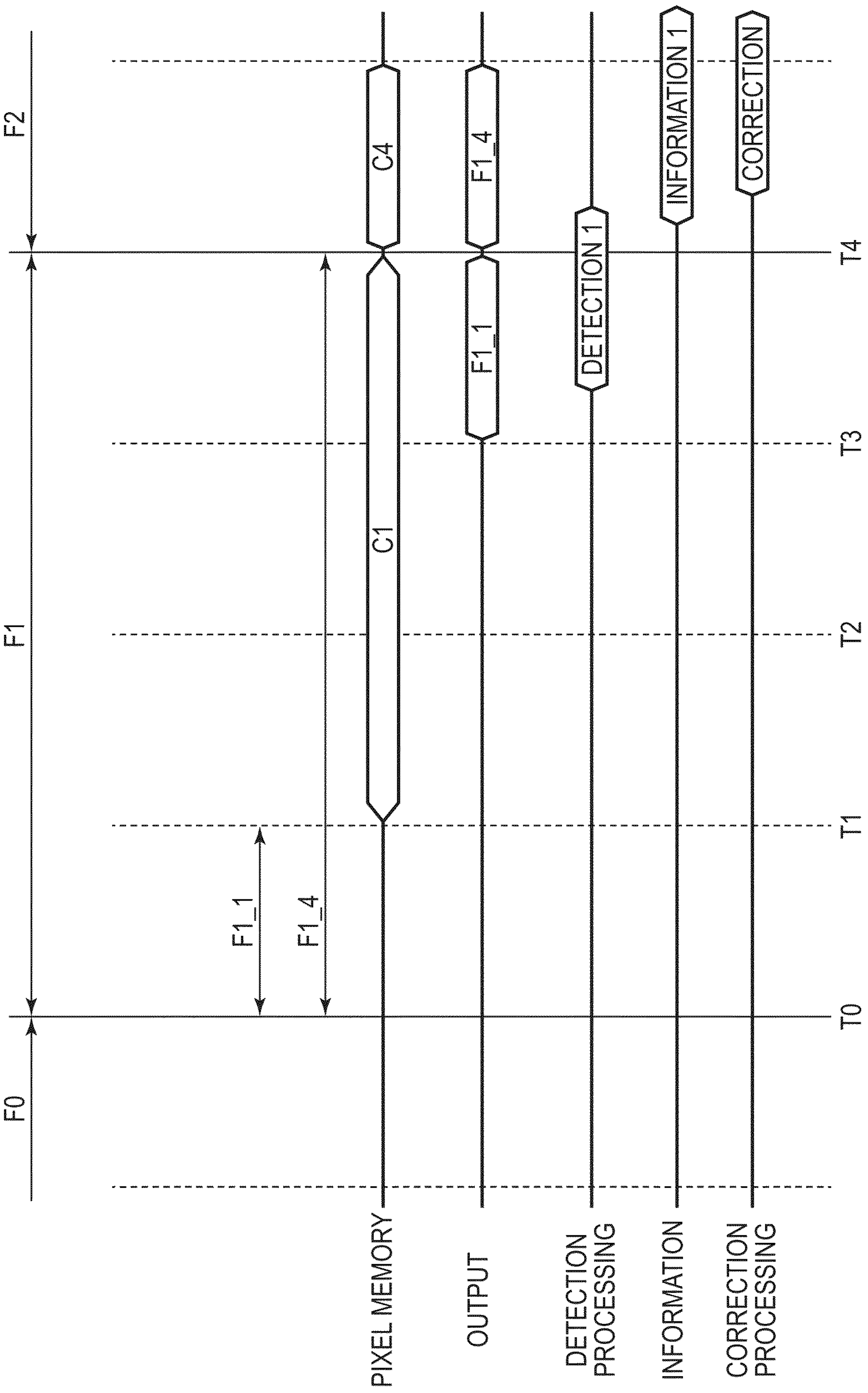
FIG. 16 is a timing chart for explaining an operation of the signal processing unit according to the third embodiment.

FIG. 16 is a timing chart for explaining an operation of the signal processing unit 117 according to the present embodiment. FIG. 16 illustrates timings of signal input to the signal processing unit 117, signal processing in the signal processing unit 117, and the like. The method of notating each item in FIG. 16 is substantially the same as that in FIG. 11, and thus the description thereof is omitted.

At time T1, an image in accumulation period F1_1 is held in the pixel memory 222. In the present embodiment, since no frame buffer capable of holding one frame image is arranged in the signal processing unit 117, the image in accumulation period F1_1 is not output and remains held in the pixel memory 222 between time T1 and time T3. At time T3, after the output of the image in accumulation period F1_1 is started, the abnormal pixel detection unit 173 starts abnormal pixel detection processing ("detection 1" in FIG. 16). After a predetermined time has elapsed from the start of the abnormal pixel detection processing, the abnormal pixel detection unit 173 updates the abnormal pixel information to be output to the abnormal pixel correction unit 175 ("information 1" in FIG. 16). Abnormal pixel information 1 is updated after the predetermined time elapses. After the output of the image in accumulation period F1_4 is started at time T4, the abnormal pixel correction unit 175 starts abnormal pixel correction processing ("correction" in FIG. 16) using the abnormal pixel information output from the abnormal pixel detection unit 173.

According to the present embodiment, there are provided a photoelectric conversion device, an information processing device, a method for controlling a photoelectric conversion device, and an information processing method capable of obtaining effects similar to those of the first embodiment. Furthermore, according to the present embodiment, since a frame buffer capable of holding a frame image is not arranged and abnormal pixel detection processing and abnormal pixel correction processing are performed in real time, the storage capacity of the memory used in the signal processing unit 117 can be reduced.

Fourth Embodiment

In the first to third embodiments, an abnormal pixel is detected and the abnormal pixel is corrected every time an image is input to the signal processing unit 117. On the other hand, in the present embodiment, a configuration example in which an abnormal pixel is detected at a timing when a predetermined situation change occurs and abnormal pixel information is updated will be described. In the present embodiment, the description of elements common to any of the first to third embodiments may be omitted or simplified.

Figure 17:
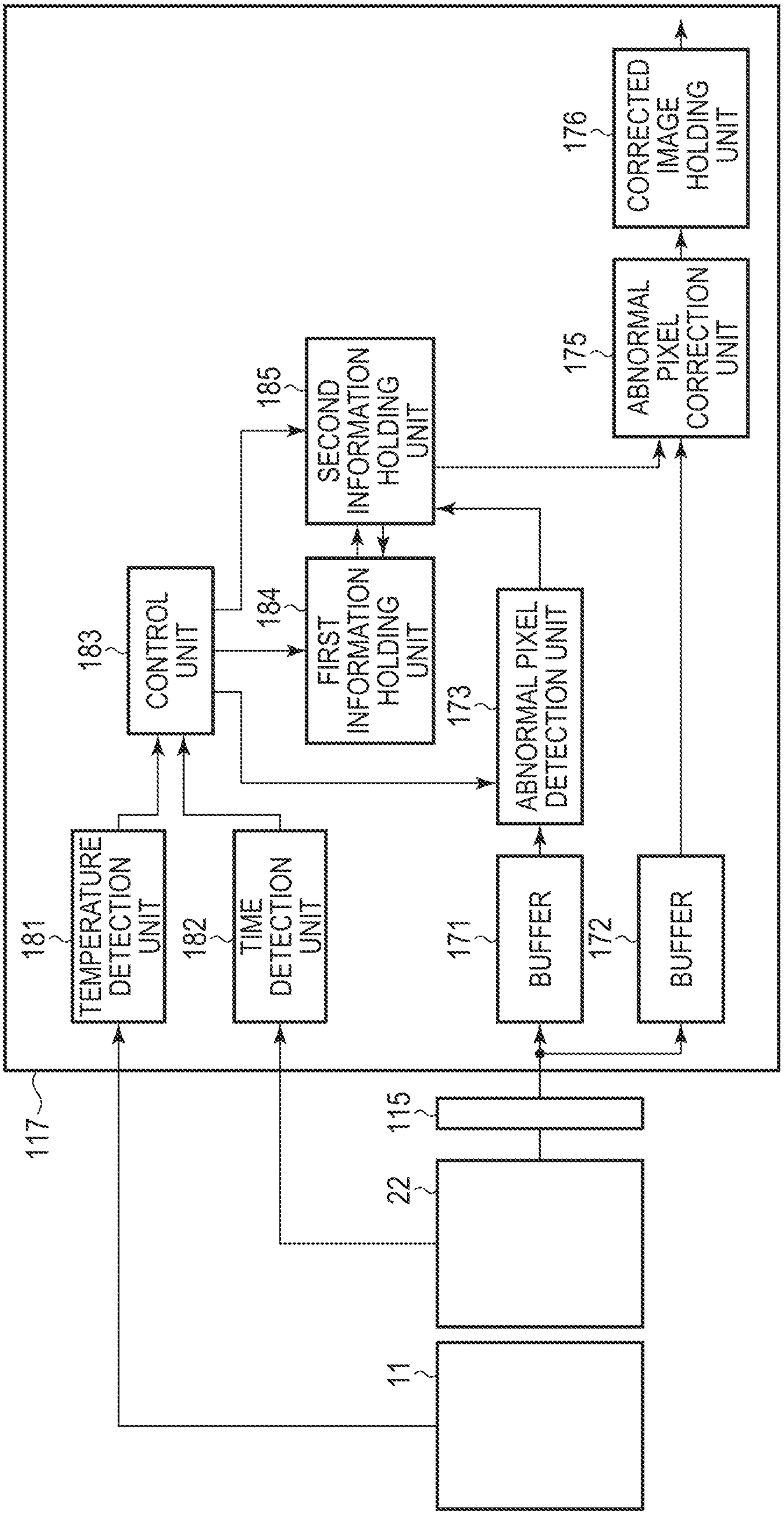
FIG. 17 is a block diagram illustrating a configuration example of a signal processing unit according to a fourth embodiment.

FIG. 17 is a block diagram illustrating a configuration example of the signal processing unit 117 according to the present embodiment. The signal processing unit 117 of FIG. 17 further includes a temperature detection unit 181, a time detection unit 182, and a control unit 183 in addition to the configuration of the signal processing unit 117 of FIG. 9. In addition, the signal processing unit 117 in FIG. 17 includes a first information holding unit 184 and a second information holding unit 185. The first information holding unit 184 and the second information holding unit 185 correspond to the abnormal pixel information holding unit 174 in FIG. 9.

In the present embodiment, abnormal pixel information is held by both a nonvolatile memory and a volatile memory. The first information holding unit 184 includes a nonvolatile memory such as a flash memory. The first information holding unit 184 stores in advance abnormal pixel information detected during inspection or the like at the time of factory shipment or abnormal pixel information acquired during past operations. The second information holding unit 185 includes a volatile memory such as SRAM or DRAM. The second information holding unit 185 temporarily stores abnormal pixel information acquired by abnormal pixel detection processing. The abnormal pixel information stored in the second information holding unit 185 is appropriately updated when abnormal pixel detection processing is performed. In addition, the abnormal pixel information held in the second information holding unit 185 disappears when the power supply of the photoelectric conversion device 100 is turned off.

The temperature detection unit 181 acquires temperature information from a temperature sensor arranged in the sensor substrate 11, and outputs the temperature information to the control unit 183. As a result, the control unit 183 can detect a change in temperature of the pixel 101.

The time detection unit 182 acquires time information corresponding to a cumulative operating time, and outputs the time information to the control unit 183. This time information may be acquired, for example, based on the number of times of avalanche multiplication detected by a pulse detection sensor arranged in the first circuit region 22, or may be acquired based on an operation time of the photoelectric conversion device 100. As a result, the control unit 183 can detect an amount of change in cumulative operating time.

The control unit 183 controls the abnormal pixel detection unit 173, the first information holding unit 184, and the second information holding unit 185 based on the temperature information acquired by the temperature detection unit 181 and the time information acquired by the time detection unit 182.

The abnormal pixel correction unit 175 acquires the abnormal pixel information stored in the second information holding unit 185. Based on the abnormal pixel information, the abnormal pixel correction unit 175 corrects an abnormal pixel in an image output from the buffer 172, and outputs the corrected image to the corrected image holding unit 176.

Figure 18:
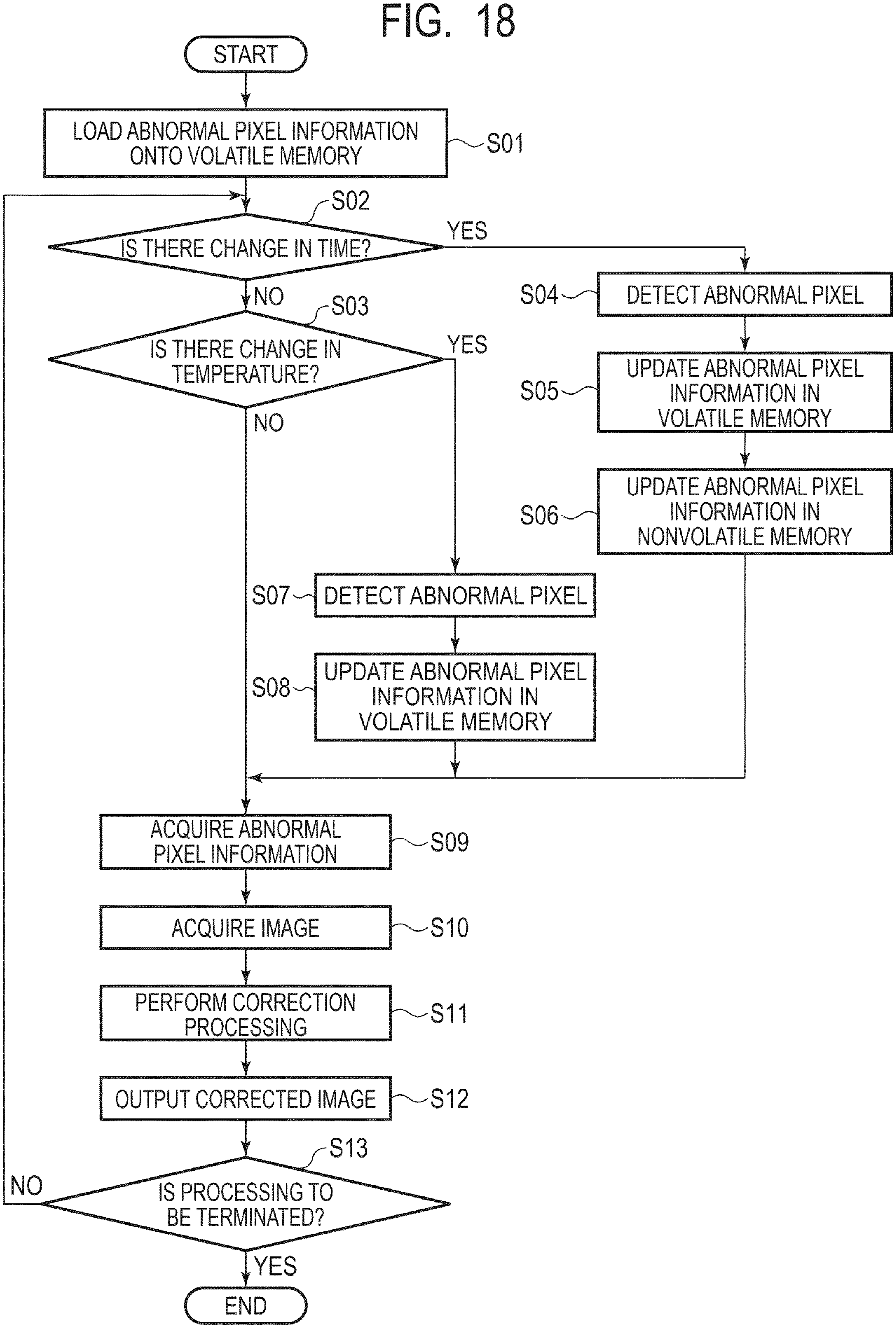
FIG. 18 is a flowchart for explaining an operation of a photoelectric conversion device according to the fourth embodiment.

FIG. 18 is a flowchart for explaining an operation of the photoelectric conversion device 100 according to the present embodiment. FIG. 18 illustrates a processing procedure from the start of the photoelectric conversion device 100 to the end of the operation.

In step S01 immediately after the photoelectric conversion device 100 is started, the control unit 183 performs control to load abnormal pixel information from the first information holding unit 184 including a nonvolatile memory to the second information holding unit 185 including a volatile memory. As a result, the abnormal pixel correction unit 175 can acquire the abnormal pixel information.

In step S02, the control unit 183 acquires time information from the time detection unit 182, and determines whether the amount of change in cumulative operating time of the first circuit region 22 exceeds a predetermined threshold. When the amount of change in cumulative operating time exceeds the threshold (YES in step S02), the process proceeds to step S04. When the amount of change in cumulative operating time does not exceed the threshold (NO in step S02), the process proceeds to step S03.

In step S04, the control unit 183 outputs a control signal for instructing the abnormal pixel detection unit 173 to perform abnormal pixel detection processing. The abnormal pixel detection unit 173 performs abnormal pixel detection processing similar to that described in the first embodiment, and outputs abnormal pixel information to the second information holding unit 185.

In step S05, the second information holding unit 185 updates the abnormal pixel information held in the volatile memory. Thereafter, in step S06, the first information holding unit 184 acquires the abnormal pixel information held in the volatile memory of the second information holding unit 185, and updates the abnormal pixel information held in the nonvolatile memory. Thereafter, the process proceeds to step S09.

In step S03, the control unit 183 acquires temperature information from the temperature detection unit 181, and determines whether the amount of change in temperature exceeds a predetermined threshold. When the amount of change in temperature exceeds the threshold (YES in step S03), the process proceeds to step S07. When the amount of change in temperature does not exceed the threshold (NO in step S03), the process proceeds to step S09.

In step S07, the control unit 183 outputs a control signal for instructing the abnormal pixel detection unit 173 to perform abnormal pixel detection processing. The abnormal pixel detection unit 173 performs abnormal pixel detection processing similar to that described in the first embodiment, and outputs abnormal pixel information to the second information holding unit 185.

In step S08, the second information holding unit 185 updates the abnormal pixel information held in the volatile memory. Thereafter, the process proceeds to step S09.

The operations of subsequent steps S09 to S12 are generally similar to the abnormal pixel correction processing described in the first embodiment. In step S09, the abnormal pixel correction unit 175 acquires the abnormal pixel information held in the volatile memory of the second information holding unit 185. In step S10, the abnormal pixel correction unit 175 acquires an image from the buffer 172. In step S11, the abnormal pixel correction unit 175 corrects an abnormal pixel of the acquired image based on the abnormal pixel information, and outputs the corrected image to the corrected image holding unit 176. In step S12, the corrected image holding unit 176 outputs the corrected image to a circuit at the subsequent stage.

In step S13, the control unit 183 determines whether it is time to terminate the imaging operation of the photoelectric conversion device 100. When it is time to terminate the imaging operation (YES in step S13), the process of FIG. 18 ends. When it is not time to terminate the imaging operation (NO in step S13), the process proceeds to step S02, and the same abnormal pixel detection processing and abnormal pixel correction processing are repeated.

In this manner, in the present embodiment, an abnormal pixel is detected and updated according to the amount of change in temperature or the amount of change in cumulative operating time. An effect obtained by performing such an operation will be described.

In general, the number of abnormal pixels depends on the temperature of the sensor substrate 11 on which the pixels 101 are arranged. For example, when the temperature of the sensor substrate 11 rises, the number of abnormal pixels tends to increase as compared with that when the temperature is low. Therefore, if abnormal pixels are corrected at a high temperature using abnormal pixel information detected in a low temperature state, correction omission may occur due to an increase in the number of abnormal pixels accompanying the rise in temperature. Therefore, in the present embodiment, when a change in temperature exceeding the predetermined threshold is detected by the temperature detection unit 181, the abnormal pixel detection unit 173 detects an abnormal pixel and updates the abnormal pixel information in the second information holding unit 185.

In addition, when the cumulative operating time of the photoelectric conversion device 100 increases, the number of abnormal pixels may increase due to aging deterioration or the like. Therefore, if abnormal pixels of the photoelectric conversion device 100 are corrected using old abnormal pixel information, correction omission may occur due to an increase in the number of abnormal pixels due to aging deterioration or the like. Therefore, in the present embodiment, when a lapse of a predetermined cumulative operating time is detected by the time detection unit 182, the abnormal pixel detection unit 173 detects an abnormal pixel and updates the abnormal pixel information in the first information holding unit 184 and the second information holding unit 185.

As a result, the abnormal pixel information is updated when it is effective to update the abnormal pixel information due to a change in temperature or a lapse of time, and otherwise, the abnormal pixel detection processing is omitted, thereby reducing the system load and power consumption required for abnormal pixel detection.

Note that, since the temperature of the sensor substrate 11 changes in a relatively short cycle depending on the operating time of the photoelectric conversion device 100 and the surrounding environment in which the photoelectric conversion device 100 is used, the abnormal pixel information may also be updated in a relatively short cycle. Therefore, it is preferable that the update of the abnormal pixel information accompanying the change in temperature is applied only to the volatile memory of the second information holding unit 185. On the other hand, a change of an abnormal pixel caused by a change over time or the like occurs in a relatively long cycle and is irreversible. Therefore, it is preferable that the update of the abnormal pixel information with the lapse of time is also applied to the nonvolatile memory of the first information holding unit 184. As a result, the same abnormal pixel information can be reused even after the photoelectric conversion device 100 is restarted.

According to the present embodiment, there are provided a photoelectric conversion device, an information processing device, a method for controlling a photoelectric conversion device, and an information processing method capable of obtaining effects similar to those of the first embodiment. Furthermore, according to the present embodiment, the system load and power consumption required for abnormal pixel detection can be reduced.

Fifth Embodiment

Figure 19:
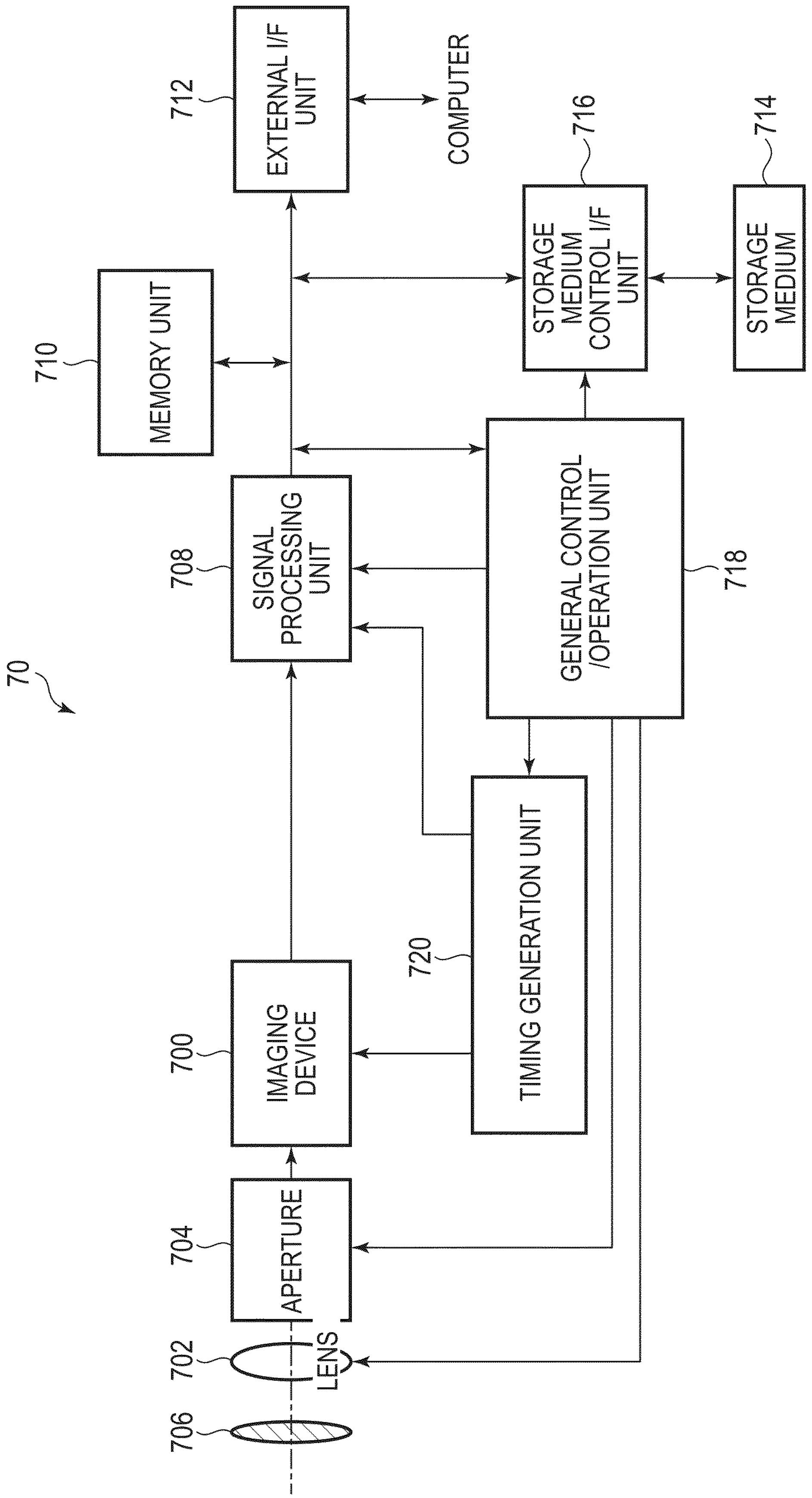
FIG. 19 is a block diagram of equipment according to a fifth embodiment.

The photoelectric conversion device 100 of the above embodiments can be applied to various equipment. Examples of the equipment include a digital still camera, a digital camcorder, a camera head, a copying machine, a facsimile, a mobile phone, a vehicle-mounted camera, an observation satellite, and a surveillance camera. FIG. 19 is a block diagram of a digital still camera as an example of equipment. FIG. 19 illustrates an example in which the photoelectric conversion device 100 is applied to a digital still camera.

The equipment 70 illustrated in FIG. 19 includes a barrier 706, a lens 702, an aperture 704, and an imaging device 700 (an example of the photoelectric conversion device 100). The equipment 70 further includes a signal processing unit (processing device) 708, a timing generation unit 720, a general control/operation unit 718 (control device), a memory unit 710 (storage device), a storage medium control I/F unit 716, a storage medium 714, and an external I/F unit 712. The information processing device 30 of the above-described embodiments may be included in the imaging device 700 or may be included in the signal processing unit 708. At least one of the barrier 706, the lens 702, and the aperture 704 is an optical device corresponding to the equipment. The barrier 706 protects the lens 702, and the lens 702 forms an optical image of an object on the imaging device 700. The aperture 704 varies the amount of light passing through the lens 702. The imaging device 700 is configured as in the above embodiments, and converts an optical image formed by the lens 702 into image data (image signal). The signal processing unit 708 performs various corrections, data compression, and the like on the image data output from the imaging device 700. The timing generation unit 720 outputs various timing signals to the imaging device 700 and the signal processing unit 708. The general control/operation unit 718 controls the entire digital still camera, and the memory unit 710 temporarily stores image data. The storage medium control I/F unit 716 is an interface for storing or reading image data on the storage medium 714, and the storage medium 714 is a detachable storage medium such as a semiconductor memory for storing or reading image data. The external I/F unit 712 is an interface for communicating with an external computer or the like. The timing signal or the like may be input from the outside of the equipment. The equipment 70 may further include a display device (a monitor, an electronic view finder, or the like) for displaying information obtained by the photoelectric conversion device. The equipment includes at least a photoelectric conversion device. Further, the equipment 70 includes at least one of an optical device, a control device, a processing device, a display device, a storage device, and a mechanical device that operates based on information obtained by the photoelectric conversion device. The mechanical device is a movable portion (for example, a robot arm) that receives a signal from the photoelectric conversion device for operation.

Each pixel may include a plurality of photoelectric conversion units (a first photoelectric conversion unit and a second photoelectric conversion unit). The signal processing unit 708 may be configured to process a pixel signal based on charges generated in the first photoelectric conversion unit and a pixel signal based on charges generated in the second photoelectric conversion unit, and acquire distance information from the imaging device 700 to an object.

Sixth Embodiment

Figure 20A:
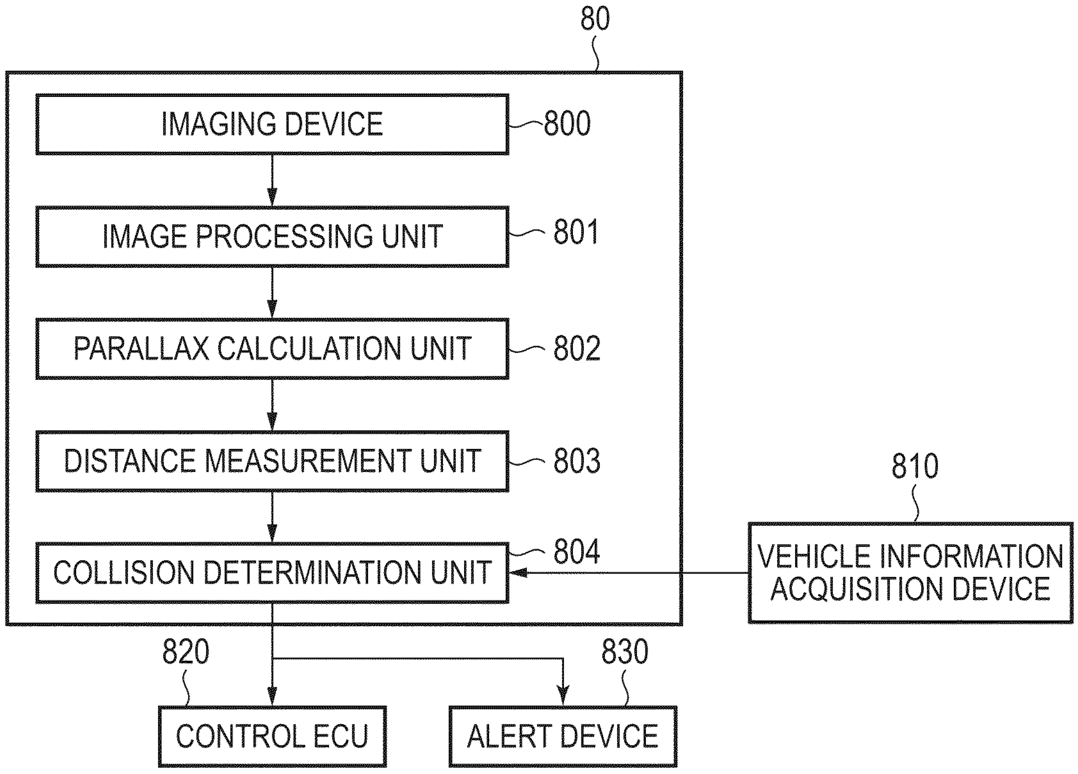
FIGS. 20A and 20B are block diagrams of equipment according to a sixth embodiment.
Figure 20B:
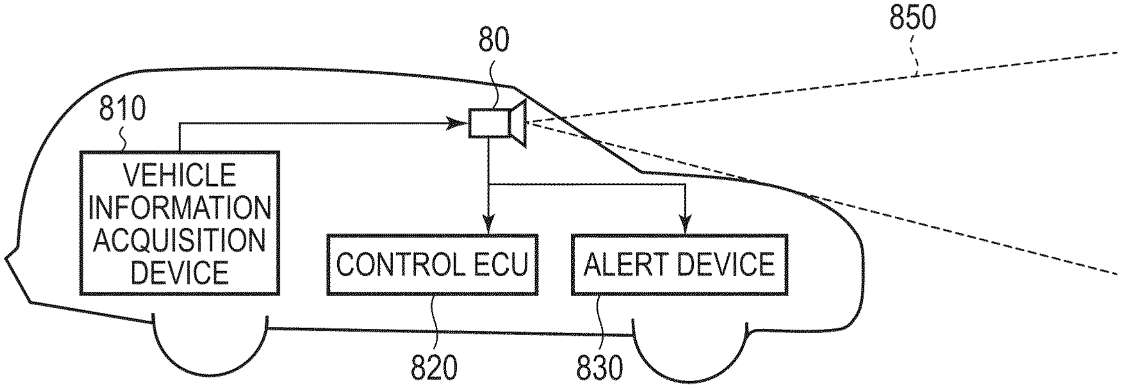

FIGS. 20A and 20B are block diagrams of equipment relating to the vehicle-mounted camera according to the present embodiment. FIGS. 20A and 20B illustrate an example in which the photoelectric conversion device 100 is applied to a movable body such as a vehicle. The equipment 80 includes an imaging device 800 (an example of the photoelectric conversion device 100 or a photoelectric conversion system) and a signal processing device (processing device) that processes a signal from the imaging device 800. The equipment 80 includes an image processing unit 801 that performs image processing on a plurality of pieces of image data acquired by the imaging device 800, and a parallax calculation unit 802 that calculates parallax (phase difference of parallax images) from the plurality of pieces of image data acquired by the equipment 80. The information processing device 30 of the above-described embodiments may be included in the imaging device 800 or may be included in the image processing unit 801. The equipment 80 includes a distance measurement unit 803 that calculates a distance to an object based on the calculated parallax, and a collision determination unit 804 that determines whether or not there is a possibility of collision based on the calculated distance. Here, the parallax calculation unit 802 and the distance measurement unit 803 are examples of a distance information acquisition unit that acquires distance information to the object. That is, the distance information is information on a parallax, a defocus amount, a distance to the object, and the like. The collision determination unit 804 may determine the possibility of collision using any of these pieces of distance information. The distance information acquisition unit may be realized by dedicatedly designed hardware or software modules. Further, it may be realized by a field programmable gate array (FPGA), an application specific integrated circuit (ASIC) or a combination thereof.

The equipment 80 is connected to the vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm such as a sound, displaying alert information on a screen of a car navigation system or the like, or giving vibration to a seat belt or a steering wheel. The equipment 80 functions as a control unit that controls the operation of controlling the vehicle as described above.

In the present embodiment, an image of the periphery of the vehicle, for example, the front or the rear is captured by the equipment 80. FIG. 20B illustrates equipment in a case where an image is captured in front of the vehicle (image capturing range 850). The vehicle information acquisition device 810 as the imaging control unit sends an instruction to the equipment 80 or the imaging device 800 to perform the imaging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above embodiments, and various modifications are possible. For example, an example in which some of the configurations of any one of the embodiments are added to other embodiments or an example in which some of the configurations of any one of the embodiments are replaced with some of the configurations of other embodiments are also embodiments of the present invention.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-029439, filed Feb. 29, 2024, which is hereby incorporated by reference herein in its entirety.

What is claimed is:

1. A photoelectric conversion device comprising:

a pixel configured to generate a signal corresponding to an amount of incident light;

a memory configured to hold the signal; and a processing unit configured to perform signal processing based on the signal held in the memory, wherein the pixel generates the signal in a second accumulation period including a first accumulation period and a period after the first accumulation period, wherein the processing unit acquires a first signal corresponding to an amount of incident light in the first accumulation period from the memory in a period from an end of the first accumulation period to an end of the second accumulation period, wherein the processing unit generates pixel information indicating that a pixel does not satisfy a predetermined criterion when it is detected that the pixel does not satisfy the predetermined criterion by using the first signal, wherein the processing unit acquires a second signal corresponding to an amount of incident light in the second accumulation period from the memory after the end of the second accumulation period, and wherein the processing unit corrects the second signal based on the pixel information.

2. The photoelectric conversion device according to claim 1, wherein a period in which the processing unit detects that the pixel does not satisfy the predetermined criterion at least partially overlaps the second accumulation period.

3. The photoelectric conversion device according to claim 1, wherein the pixel includes an avalanche photodiode, and wherein the memory holds a count value based on a photon incident on the avalanche photodiode as the signal.

4. The photoelectric conversion device according to claim 3, wherein the count value is not reset from a start of the second accumulation period to the end of the second accumulation period.

5. The photoelectric conversion device according to claim 1, wherein the photoelectric conversion device includes a plurality of the pixels, and wherein the pixel information includes information indicating a coordinate of a pixel detected not to satisfy the predetermined criterion among the plurality of pixels.

6. The photoelectric conversion device according to claim 5, wherein the processing unit corrects the second signal corresponding to the pixel at the coordinate.

7. The photoelectric conversion device according to claim 1, wherein the second accumulation period includes a plurality of the first accumulation periods, wherein the processing unit acquires a plurality of the first signals during a period from a start of the second accumulation period to the end of the second accumulation period, and wherein the processing unit generates the pixel information based on the plurality of first signals.

8. The photoelectric conversion device according to claim 7, wherein the processing unit generates a detection result of a 1-bit value based on each of the plurality of first signals, and generates the pixel information based on a logical product of a plurality of the detection results.

9. The photoelectric conversion device according to claim 7, wherein the processing unit generates a detection result of a 1-bit value based on each of the plurality of first signals, and generates the pixel information based on a logical sum of a plurality of the detection results.

10. The photoelectric conversion device according to claim 7, wherein the processing unit generates a detection result of a 1-bit value based on each of the plurality of first signals, and generates the pixel information based on a majority logic of a plurality of the detection results.

11. The photoelectric conversion device according to claim 7, wherein the processing unit generates the pixel information further based on a plurality of different thresholds set to correspond to the plurality of first signals, respectively.

12. The photoelectric conversion device according to claim 1, the photoelectric conversion device includes a plurality of the pixels, and the processing unit generates the pixel information by sequentially processing a plurality of the first signals output from the plurality of pixels, respectively, rather than temporarily storing the plurality of first signals simultaneously.

13. The photoelectric conversion device according to claim 1 further comprising:

a holding unit configured to hold the pixel information; and a temperature detection unit configured to detect a temperature of the pixel, wherein the holding unit updates the pixel information based on an amount of change in temperature.

14. The photoelectric conversion device according to claim 1, further comprising:

a holding unit configured to hold the pixel information; and a time detection unit configured to detect a cumulative operating time of the photoelectric conversion device, wherein the holding unit updates the pixel information based on an amount of change in cumulative operating time.

15. The photoelectric conversion device according to claim 14, wherein the holding unit includes a nonvolatile memory, and wherein the holding unit updates the pixel information held in the nonvolatile memory.

16. Equipment comprising:

the photoelectric conversion device according to claim 1; and at least any one of:

an optical device adapted for the photoelectric conversion device, a control device configured to control the photoelectric conversion device, a processing device configured to process a signal output from the photoelectric conversion device, a display device configured to display information obtained by the photoelectric conversion device, a storage device configured to store information obtained by the photoelectric conversion device, and a mechanical device configured to operate based on information obtained by the photoelectric conversion device.

17. The equipment according to claim 16, wherein the processing device acquires distance information on a distance from the photoelectric conversion device to an object.

18. An information processing device comprising:

a detection unit configured to generate pixel information indicating that a pixel does not satisfy a predetermined criterion when it is detected that the pixel does not satisfy the predetermined criterion by using a first signal corresponding to an amount of light incident on the pixel in a first accumulation period; and a correction unit configured to correct a second signal corresponding to an amount of light incident on the pixel in a second accumulation period including the first accumulation period and a period after the first accumulation period based on the pixel information, wherein the detection unit acquires the first signal during a period from an end of the first accumulation period to an end of the second accumulation period, and wherein the correction unit acquires the second signal after the end of the second accumulation period.

19. A method for controlling a photoelectric conversion device including a pixel configured to generate a signal corresponding to an amount of incident light, a memory configured to hold the signal, and a processing unit configured to perform signal processing based on the signal held in the memory, the method comprising:

generating, by the pixel, the signal in a second accumulation period including a first accumulation period and a period after the first accumulation period;

acquiring, by the processing unit, a first signal corresponding to an amount of incident light in the first accumulation period from the memory in a period from an end of the first accumulation period to an end of the second accumulation period;

generating, by the processing unit, pixel information indicating that a pixel does not satisfy a predetermined criterion when it is detected that the pixel does not satisfy the predetermined criterion by using the first signal;

acquiring, by the processing unit, a second signal corresponding to an amount of incident light in the second accumulation period from the memory after the end of the second accumulation period; and correcting, by the processing unit, the second signal based on the pixel information.

20. An information processing method comprising:

generating abnormal pixel information indicating an abnormal pixel detection result based on a first signal corresponding to an amount of light incident on a pixel in a first accumulation period; and correcting a second signal corresponding to an amount of light incident on the pixel in a second accumulation period including the first accumulation period and a period after the first accumulation period based on the abnormal pixel information, wherein the first signal is acquired during a period from an end of the first accumulation period to an end of the second accumulation period, and wherein the second signal is acquired after the end of the second accumulation period.

* * * * *